US012689677B2

(12) United States Patent
Yoganathan et al.

(10) Patent No.: US 12,689,677 B2
(45) Date of Patent: Jul. 21, 2026

(54) SYSTEM AND METHOD FOR SENSOR FUSION BASED COLLISION AND QUADRANT DETECTION, AND SEVERITY OF ACCIDENT DETERMINATION

(71) Applicant: Moter Technologies, Inc., Torrance, CA (US)

(72) Inventors: Sivashankar Yoganathan, Moorpark, CA (US); William Taylor, Venice, CA (US); Sherilyn Tamagawa, Signal Hill, CA (US); Patrick Heffernan, Moorpark, CA (US); James Makishima, Rancho Palos Verdes, CA (US); Kenji Fujii, Torrance, CA (US); Craig Lozofsky, Torrance, CA (US); Erika Shimojo, Torrance, CA (US); Taku Yamane, Torrance, CA (US); Eric Khajik Gerigouri, Glendale, CA (US); Yanghao Cheng, Costa Mesa, CA (US)

(73) Assignee: Moter Technologies, Inc., Torrance, CA (US)

( * ) Notice: Subject to any disclaimer, the term of this patent is extended or adjusted under 35 U.S.C. 154(b) by 0 days.

(21) Appl. No.: 18/885,026

(22) Filed: Sep. 13, 2024

(65) Prior Publication Data

US 2025/0097299 A1    Mar. 20, 2025

Related U.S. Application Data

(60) Provisional application No. 63/582,755, filed on Sep. 14, 2023.

(51) Int. Cl.
| | |
|---|---|
| *H04L 67/125* | (2022.01) |
| *G06Q 40/08* | (2012.01) |
| *H04W 4/40* | (2018.01) |

(52) U.S. Cl.
CPC .......... *H04L 67/125* (2013.01); *G06Q 40/08* (2013.01); *H04W 4/40* (2018.02)

(58) Field of Classification Search
CPC ...... H04L 67/125; G06Q 40/08; G06Q 50/40; H04W 4/40; G06F 18/254; G07C 5/0841;
(Continued)

(56) References Cited

U.S. PATENT DOCUMENTS

| | | | |
|---|---|---|---|
| 5,969,598 A | 10/1999 | Kimura | |
| 6,076,028 A | 6/2000 | Donnelly et al. | |

(Continued)

FOREIGN PATENT DOCUMENTS

| | | | | |
|---|---|---|---|---|
| CN | 115056773 A | 9/2022 | | |
| EP | 4365046 A1 * | 1/2023 | | |
| WO | WO-2014207558 A2 * | 12/2014 | .......... | G07C 5/0841 |

OTHER PUBLICATIONS

PCT/US204/046691. International Search Report & Written Opinion (Dec. 11, 2024).

*Primary Examiner* — Omar Casillashernandez
(74) *Attorney, Agent, or Firm* — Heidi Eisenhut; LOZA & LOZA, LLP

(57) ABSTRACT

The present disclosure discloses systems and methods that can be implemented on the edge system in a vehicle for near real-time detection of collisions with multi-level confidence (i.e., low confidence, moderate confidence, high confidence), automated gathering and report generation of collision information required for post-accident analysis in a manner suitable for insurance company process workflow and storing the confidential collision details securely on the vehicle (edge) system. Confidence is determined by preconfigured adaptive thresholds measured by sensor data.

32 Claims, 30 Drawing Sheets

(58) Field of Classification Search
CPC .............. B60R 21/013; B60R 21/0132; B60R 21/0134; B60R 2021/01322; B60R 2021/01325; G08G 1/166; G08G 1/205
USPC ......................................................... 340/436
See application file for complete search history.

(56) References Cited

U.S. PATENT DOCUMENTS

| | | | |
|---|---|---|---|
| 8,725,346 B2 | 5/2014 | Xu et al. | |
| 8,749,350 B2 | 6/2014 | Geisler et al. | |
| 8,825,277 B2 | 9/2014 | Mcclellan et al. | |
| 9,774,734 B2 | 9/2017 | Kim | |
| 10,121,291 B2 | 11/2018 | Cuddihy et al. | |
| 10,282,922 B1 | 5/2019 | Nejah et al. | |
| 10,417,897 B1 * | 9/2019 | Nave | G06Q 50/40 |
| 10,807,593 B1 | 10/2020 | Nave et al. | |
| 10,997,800 B1 | 5/2021 | Salodkar et al. | |
| 11,158,138 B2 | 10/2021 | Bayley | |
| 11,203,315 B2 | 12/2021 | Shea et al. | |
| 11,276,256 B2 | 3/2022 | Chainer et al. | |
| 11,756,431 B2 * | 9/2023 | Taccari | G06V 20/10 |
| | | | 382/104 |
| 2009/0138160 A1 | 5/2009 | Iyoda | |
| 2019/0344740 A1 * | 11/2019 | Hakki | B60R 21/0132 |
| 2020/0334928 A1 | 10/2020 | Bourk et al. | |
| 2021/0223391 A1 | 7/2021 | Drysch et al. | |
| 2021/0225094 A1 | 7/2021 | Salodkar et al. | |
| 2022/0092891 A1 | 3/2022 | Bangad et al. | |
| 2023/0103839 A1 * | 4/2023 | Nelson | G07C 5/0841 |
| | | | 726/4 |
| 2024/0412575 A1 * | 12/2024 | Taylor | H04W 4/021 |

* cited by examiner

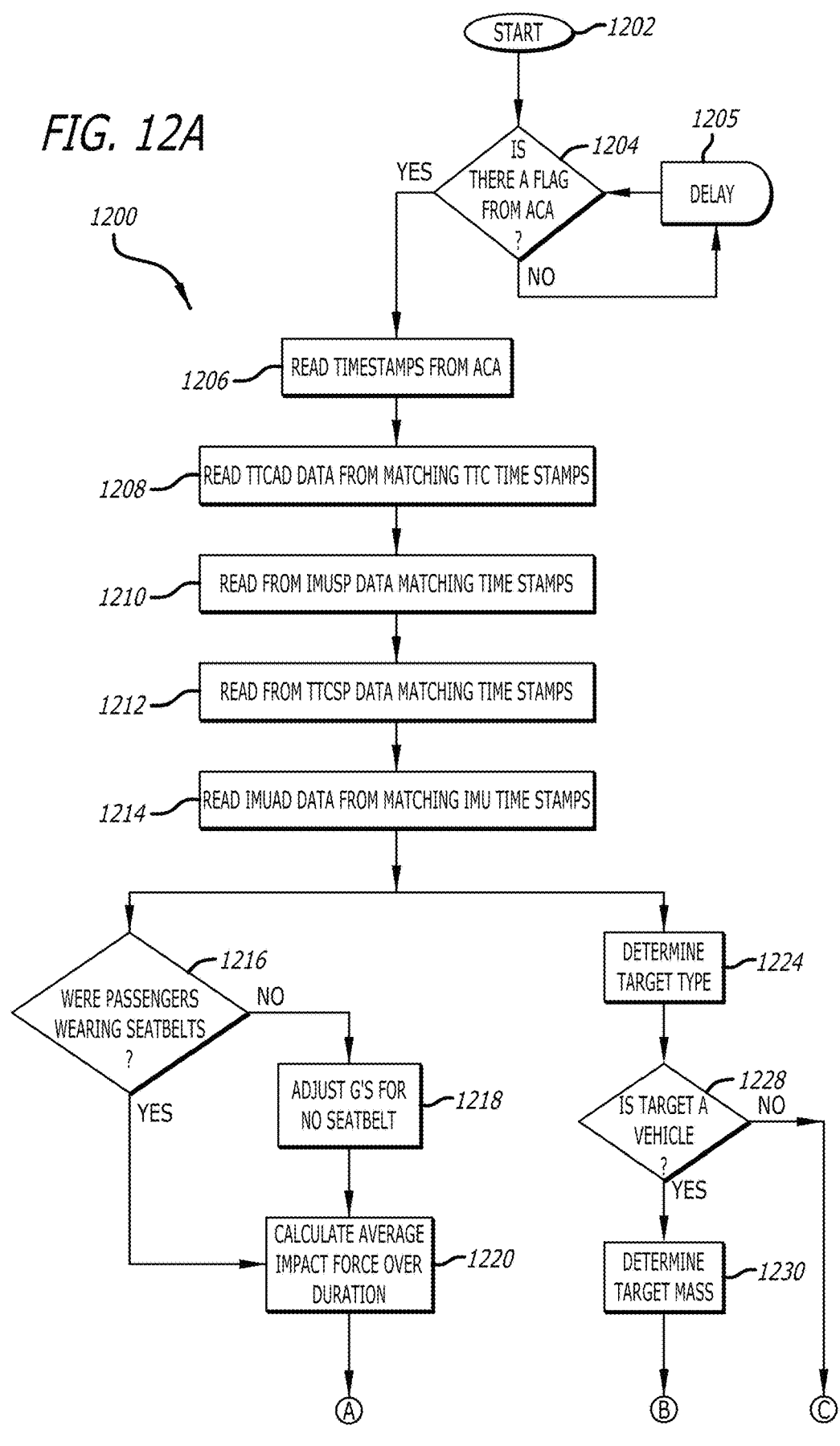

START —1202

IS THERE A FLAG FROM ACA? —1204

YES

DELAY —1205

NO

READ TIMESTAMPS FROM ACA —1206

READ TTCAD DATA FROM MATCHING TTC TIME STAMPS —1208

READ FROM IMUSP DATA MATCHING TIME STAMPS —1210

READ FROM TTCSP DATA MATCHING TIME STAMPS —1212

READ IMUAD DATA FROM MATCHING IMU TIME STAMPS —1214

WERE PASSENGERS WEARING SEATBELTS? —1216

NO

ADJUST G'S FOR NO SEATBELT —1218

YES

CALCULATE AVERAGE IMPACT FORCE OVER DURATION —1220

DETERMINE TARGET TYPE —1224

IS TARGET A VEHICLE? —1228

NO

YES

DETERMINE TARGET MASS —1230

A          B          C

SYSTEM AND METHOD FOR SENSOR FUSION BASED COLLISION AND QUADRANT DETECTION, AND SEVERITY OF ACCIDENT DETERMINATION

CLAIM OF PRIORITY

The present Application for Patent claims priority to U.S. Provisional Application No. 63/582,755 entitled "Systems and Method for Sensor Fusion Based Collision and Quadrant Detection, and Severity of Accident Determination", filed Sep. 14, 2023, which is hereby expressly incorporated by reference.

TECHNICAL FIELD

The technology discussed below relates generally to systems, apparatuses, and methods for evaluating collisions involving vehicles.

BACKGROUND

Collision detection, severity, and reporting is currently solved using data collected from several types of telematics sensors embedded in vehicles. Some of the primary sensors used are accelerometers, gyroscopes, GPS receivers, cameras, radar sensors, ultrasonic sensors, and inertial measurement units (IMUs). These sensors can be used individually or in combination and provide a wide range of information that can be analyzed using algorithms to detect when a collision occurs, assess collision severity, and reconstruct the events leading up to the collision. Using the sensors individually, however, can result in false positive collisions. For instance, a rapid change in G-force can occur due to excessive braking or going over traffic calming devices such as road bumps and dips.

Many consumers and fleets install dashcams to provide collision evidence. These dashcams are equipped with a global positioning system (GPS), an inertial measurement unit (IMU), and a road-facing camera. When a high-G impact is detected by the IMU, the dashcam will store the data from the GPS, IMU, and camera sensors to local storage and sometimes send the data to the cloud. This data is typically in a raw format that must undergo human review and can be time and storage intensive. In some cases, vehicle occupants can also initiate sensor data storage by manually pressing a button.

The shortcomings of the current methods include a high frequency of false positive collisions, cloud storage efficiency and cost, and a time-intensive human expert event reconstruction and review period.

In view of the above, what is needed are sensor fusion and logic-based algorithms to determine an accident has occurred with high, medium, and low confidence; low-G collision detection; multiple collision detection; ego vehicle quadrant-based collision detection; ego vehicle severity detection; ego and target vehicle occupant severity detection; computer vision to determine the object type involved in the collision with the ego vehicle; edge computing and processing; and automated report generation that includes sensor data and high frequency video.

SUMMARY

The following presents a simplified summary of one or more implementations in order to provide a basic understanding of some implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

According to one example, one or more non-transitory computer readable media storing computer-executable instructions that upon execution cause one or more processors on a vehicle to perform acts is provided. The acts include activating an Inertial Measurement Unit Sensor Processor (IMUSP) at a beginning of a trip in the vehicle for collection of IMUSP data; activating a Time to Collision Sensor Processor (TTCSP) at the beginning of the trip for collection of TTCSP data; analyzing, on an IMU Accident Detector (IMUAD), the collected IMUSP data for an abnormal event exceeding a first preconfigured threshold; creating an IMUAD record using the analyzed IMUSP data; transmitting, upon detection of the abnormal event, a first accident confidence flag to an Accident Confidence Analyzer (ACA) for further analysis; analyzing, on a TTC Data Collector (TTCDC), the collected TTCSP data for a Time to Collision (TTC) or a Distance to Collision (DTC) below a second preconfigured threshold; creating a TTCAD record using the analyzed TTCSP data; analyzing, by the ACA, IMUAD and TTCAD records; and transmitting, upon detection of the TTC or the DTC below the second preconfigured threshold, a second accident confidence flag to an Accident Confidence Analyzer (ACA).

According to one aspect, the IMUSP and the TTCSP operate continuously during the trip.

According to another aspect, the TTCDC captures the data at a high frequency when the time to collision or distance to collision are below a preset threshold.

According to yet another aspect, the confidence of an occurrence of an abnormal event is Moderate when the accident confidence from the TTCAD is high and there is no accident confidence flag from the IMUAD for the corresponding quadrant.

According to yet another aspect, the confidence of an occurrence of an abnormal event is Moderate when the accident confidence from the IMUAD is high and there is no accident confidence flag from the TTCAD for the corresponding quadrant.

According to yet another aspect, the confidence of an occurrence of an abnormal event is Low when the accident confidence from the IMUAD is Moderate or Low and there is no accident confidence flag from the TTCAD for the corresponding quadrant.

According to yet another aspect, there is no recorded occurrence of an abnormal event in the ACA when the accident confidence from the TTCAD is Moderate and there is no accident confidence flag from the IMUAD for the corresponding quadrant.

According to yet another aspect, the IMUAD and the TTCAD operate continuously.

According to yet another aspect, the TTCSP data and the IMUSP data are received from one more internal sensors of the vehicle.

According to yet another aspect, the one or more internal sensors includes data from at least one of before, during, and after the abnormal event.

According to yet another aspect, the one or more internal sensors are located in a left quadrant, a right quadrant, a front quadrant, and a rear quadrant of the vehicle.

According to yet another aspect, multiple collisions in different quadrants are detected simultaneously.

According to yet another aspect, an occurrence of the abnormal event is high when the first accident confidence flag and the second accident confidence flag are received.

According to yet another aspect, the ACA waits to receive records from both the TTCAD and IMUAD for a preset threshold before determining the confidence level of the abnormal event.

According to yet another aspect, the ACA utilizes the IMUAD data and the TTCAD data to determine the confidence level of the abnormal event.

According to yet another aspect, the acts further include determining, by the ASA, a severity of damage caused by the abnormal event, using data from the ACA, IMUAD, TTCAD, IMUSP, and TTCSP.

According to yet another aspect, a severity of damage to an ego vehicle is classified as Low or High.

According to yet another aspect, a severity of injury to passengers in an ego vehicle is classified as Low, Moderate, or High.

According to yet another aspect, determining the severity of injury to the passengers in the ego vehicle's passengers includes use of seatbelts by the passengers in the ego vehicle.

According to yet another aspect, the calculation of severity of injury to passengers in an ego vehicle is performed on a local device in or on the vehicle.

According to yet another aspect, a target object type is used in determining a severity of damage.

According to yet another aspect, a severity of injury to the target vehicle's passengers is classified as Null, Low, Moderate, or High.

According to yet another aspect, the calculation of severity of injury to passengers in a target vehicle is performed on a local device in or on the vehicle.

According to yet another aspect, wherein the calculation of severity of injury to passengers in a target vehicle is performed on a local device in or on the vehicle.

According to yet another aspect, the severity of damage is classified as Low, Moderate, or High.

According to yet another aspect, the calculation of severity of damage is performed on a local device in or on the vehicle.

According to yet another aspect, the calculation of severity of damage is performed on the vehicle.

According to yet another aspect, the acts further include generating a collision report using data from the ACA, TTCSP, IMUSP, TTCDC, TTCSP, IMUAD, and TTCAD.

According to yet another aspect, the collision report is generated by a local device in or on the vehicle.

According to yet another aspect, the acts further include storing the collision report to a local storage device on the vehicle.

According to yet another aspect, the acts further include transmitting the collision report to a connected user device.

According to yet another aspect, the acts further include transmitting the collision report to a cloud.

BRIEF DESCRIPTION OF THE DRAWINGS

FIGS. 12A-12D are a flow diagram illustrating the operations of the Accident Severity Analyzer (ASA).

DETAILED DESCRIPTION

Figure 1A:
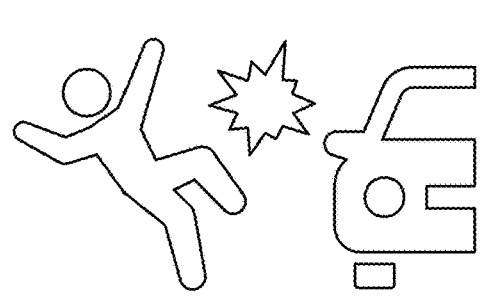
FIG. 1A illustrates a vehicle colliding with a pedestrian.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. As used herein, a reference to an element in the singular contemplates the reference to the element in the plural.

Terms

The term "sensor" may refer to any type of known sensor for sensing the dynamic conditions of a vehicle. The sensors can be stock equipment or after-market tools. The sensors can include, but are not limited to, camera sensors, infrared camera sensors, mass airflow sensors, engine speed sensors, oxygen sensors, spark knock sensors, coolant sensors, manifold absolute pressure (MAP) sensors, fuel temperature sensors, voltage sensors, camshaft position sensors, throttle position sensors, vehicle speed sensors or speedometers, proximity sensors, accelerometers, Global Positioning Systems (GPS), odometers, steering angle sensors, safety system data, radio detection and ranging (RADAR) sensors, light detection and ranging (LIDAR) sensors, and diagnostic trouble codes.

The terms "sensor data" and "vehicle sensor data" may refer to data received from any sensor in a vehicle whether it is stock equipment or after-market tools.

The term "in-vehicle sensor system" refers to sensors mounted in or on a vehicle that sense the dynamic conditions of a vehicle.

The term "vehicle" may refer to any type of machine that transports people or cargo including, but not limited to, cars, trucks, buses, motorcycles, ships, boats, drones, trains, airplanes, and helicopters.

The term "vehicle system" defines either an OEM-integrated solution or an after-market edge system solution that has both hardware and software implementation.

The term "driver" may refer to a person or the vehicle.

The terms "driver" and "user" may be used interchangeably.

The terms "fleet" and "fleets" refer to a group of vehicles, ships, or aircraft that operate together or are under the same ownership or management.

The term "edge" as used herein refers to devices, units, or modules that are located on the edge of a network, collecting and transmitting data to a central system or server. By processing data locally on the edge device, such as a telematic unit before transmitting the data, efficiency in data transmission and analysis is improved while latency is reduced.

The term "ego vehicle" refers to the vehicle that contains the sensors that perceive the environment around the vehicle. The Y-axis points forward from the vehicle. The X-axis points to the right, as viewed when facing forward. The Z-axis points up from the ground to maintain the right-handed coordinate system.

The term "target object" refers to the object with which the ego vehicle collides/nearly collides. This is often "the other vehicle" in a collision (as opposed to the ego vehicle), but it could be another object such as a wall, pedestrian, animal, guardrail, traffic attenuator, pole, tree, etc.

The term "target object type" refers to the type of object the target object is. For example, class 1 vehicle, class 3 vehicle, wall, pedestrian, animal, dog, moose, guardrail, traffic attenuator, pole, tree, etc. In some implementations, this may be as specific as "Toyota® Corolla LE Model Year 2017, parked with no occupants" and in other implementations it may be as vague as "fixed object" or "vehicle" or "parked vehicle."

The term "abnormal event" refers to an event that is not an expected part of normal driving including, but not limited to, an event that surpasses the TTC/DTC and/or IMU accelerometer thresholds. In other words, a collision or near collision.

The term "Eiband diagram" is a graphical representation used in engineering and vibration analysis that shows how a system or material responds to shock or transient vibrations.

The term "G" refers to the acceleration of Earth's gravity, approximately 9.81 meters per second squared, and the measure of acceleration of an object.

The term "high-G event" refers to an event or situation where individuals or objects are exposed to high levels of gravitational force, typically exceeding the standard 1 G (gravity on Earth's surface).

The term "sensor fusion" refers to the process of merging data from multiple sensors.

The term "Low" refers to lower than moderate/high, and before the preset low threshold. The preset thresholds may vary between implementations, with different hardware, in different situations, and as emerging technologies develop. A Low confidence collision could include situations where there is weak or inconclusive evidence of a collision, such as anomalous sensor data that can be explained by factors other than a crash. A Low severity collision may be one that only results in no/minor injuries and no/minimal property damage.

The term "Moderate" refers to between low and high, and between the preset low and high thresholds. The preset thresholds will vary between implementations, with different hardware, in different situations, and as emerging technologies develop. A Moderate confidence collision could include situations where there are indications of a collision, but some uncertainty remains, such as sensor data suggesting a potential crash but with some ambiguity. A Moderate severity collision is one that may include non-life-threatening injuries that require medical attention, and/or some property damage.

The term "High" refers to higher than moderate/low, and beyond the high preset threshold. The preset thresholds may vary between implementations, with different hardware, in different situations, and as emerging technologies develop.

The definition of the term "High Confidence" depends on the context.

i. For example, in the Time to Collision Accident Detector (TTCAD), high confidence is defined as the target object DTC (distance to collision) being closer than the preset high confidence threshold. This threshold may vary between implementations, with different hardware, in different situations, or as emerging technologies develop. In any case, the high confidence threshold will be smaller than the moderate confidence threshold.

ii. For example, in the Accident Confidence Analyzer (ACA), high confidence is defined as when an accident is detected by both the IMUAD and TTCAD. That is, multiple sensors of different types corroborate the occurrence of a collision.

iii. A similar idea is implemented in the IMUAD but is called severity instead of confidence. High severity collisions frequently result in fatalities, severe injuries, and/or severe property damage such as damage resulting in more than $5,000.

The term "high confidence" refers to the belief that an event designated as a collision is a true collision. The exact occurrence of false positive collisions varies depending on the technologies, hardware, and settings used. In some instances, false positive collisions can be approximately 40% of detected potential collisions. Anything greater than 0% is not ideal, and our invention strives to minimize this while also ensuring capture of true positive collisions.

The term "high frequency" refers to the frequency of data capture. The exact rate of high frequency capture may vary between implementations. In general, a low frequency capture may be 1 Hz, and a high frequency capture is usually higher than that, typically 5-100 Hz, but the exact frequency may vary between implementations, with different sensors, or as new technologies emerge. In any case, high frequency data capture has a higher frequency than low frequency data capture, and the high frequency data can be used to ascertain more information about the collision/near collision.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "central processing unit", "processor", "processor circuit", and "processing circuit", and variations thereof, as used herein, are used interchangeably and include, but are not limited to, a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general-purpose processor may include a microprocessor, as well as any conventional processor, controller, microcontroller, or state machine. The processor may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processors are for illustration and other suitable configurations within the scope of the disclosure are also contemplated. Furthermore, the processor may be implemented as one or more processors, one or more controllers, and/or other structure configured to execute executable programming.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

The terms "user device" and "mobile device" may refer to a mobile phone, a personal computer, a smart phone, a cell phone, a tablet, a portable computer, a machine, an entertainment device, or any other electronic device having circuitry.

Overview

The present disclosure is directed to systems and methods that can be implemented on the edge system in a vehicle for near real-time detection of collisions with multi-level confidence (i.e., Low confidence, Moderate confidence, High confidence), automated gathering of collision information required for post-accident analysis in a manner suitable for insurance company process workflow, and storing the confidential collision details securely on the edge system in the vehicle. Confidence is determined by preconfigured adaptive thresholds measured by sensor data. Novel aspects of the present disclosure include, but are not limited to:

Sensor fusion-based collision detection on the edge system.

Systems currently available utilize IMU and GPS to determine collisions. However, as described above, they result in a high occurrence of false positive collision detection. The present disclosure utilizes independent multi-sensor data analysis to verify the confidence of collision detection in near real-time on the edge system.

Low-G collision detection on the edge system.

Purely IMU-based systems can detect low-G impact collisions. The proposed solution of the present disclosure can detect collisions that are not detected by IMU-based collision detection algorithms. In other words, the systems and methods of the present disclosure can detect low-G events even if not picked up by the IMU, unlike the prior art.

Multiple collision detection on the edge system.

The utilization of multiple sensor data allows for detection of multiple collisions from different directions in near real-time on the edge system.

Ego vehicle collision quadrant determination on the edge system.

Analysis of camera sensor data along with LIDAR/RADAR and ultrasonic sensor data enables determination of side of impact in near real-time on the edge system. For example, measurement of time to collision (TTC) and distance to collision (DTC) from sensor fusion of camera sensor data and LIDAR/RADAR sensors are used to determine side(s) of impact for both single and multiple impacts.

Ego vehicle severity measurement on the edge system.

Ego vehicle occupant severity measurement on the edge system.

The severity of collision impact can be determined for the occupants in the ego vehicle.

Severity can also be further differentiated between occupants with seatbelts and without seatbelts.

Severity of collision impact can be approximated for the occupants in the target vehicle on the edge system, when relevant.

Determination of object type involved in collision with ego vehicle on the edge system.

The systems and methods of the present disclosure employ AI models to extract object details. The details include ego and target vehicle type (for instance, but not limited to, passenger car, bus, tanker, pedestrian, train, bicycle, motorbike), stationary and/or moving objects. The determination of object type involved in the collision can help in gathering information needed for automated emergency calls.

Prior art approaches require a claims adjustor to review videos as well as an inspection of the vehicle to determine the severity of the collision impact. It is a manual process that is done at a collision repair station. The proposed solution of the present disclosure, on the other hand, can determine the severity of collision impact in near real-time on the edge system by measuring the impact force and energy transfer that take place during the impact. The impact contact between objects typically lasts for less than 300 milliseconds. The sensor fusion data from camera sensors and LIDAR/RADAR can be used to determine duration of impact and energy transferred during the impact to determine the force or severity of collisions.

Automated Report Generation

The proposed solution automatically generates a detailed analysis of multiple sensor data (IMU, GPS, camera, LIDAR/RADAR) that includes collision location, collision time, single or multi-impact, details of collision object, severity of collision for ego vehicle and occupants, and sides of impact. The detailed report also uses the time of impact, speeds before and after collision of the ego vehicle and the target object, impact duration, and video captured before, during, and after the collision.

Example of Vehicle Collisions

Figure 1B:
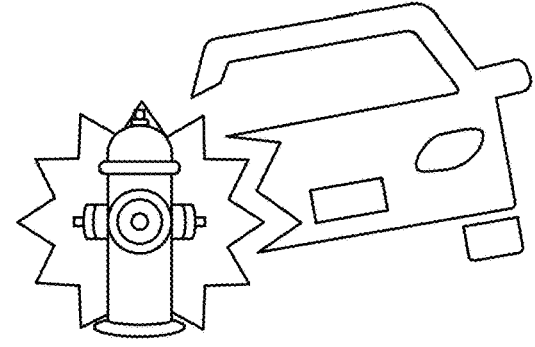
FIG. 1B illustrates a vehicle colliding with an object.
Figure 1C:
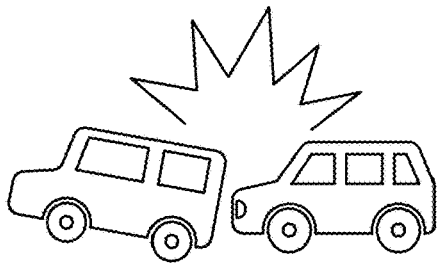
FIG. 1C illustrates two vehicles colliding.

Computer vision, large language, and visual language models are used to extract object details. The details include target vehicle type (for instance, but not limited to, passenger car, bus, tanker, pedestrian, train, bicycle, motorbike), stationary and/or moving objects, lane position, lane count, time to collision, and distance to collision. The determination of the object type involved in the collision is used to determine the severity of the collision on both the ego vehicle and target objects. Examples of collisions involving a vehicle are shown in FIGS. 1A-1C. FIG. 1A illustrates a vehicle colliding with a pedestrian. FIG. 1B illustrates a vehicle colliding with an object. FIG. 1C illustrates two vehicles colliding.

Figure 2:
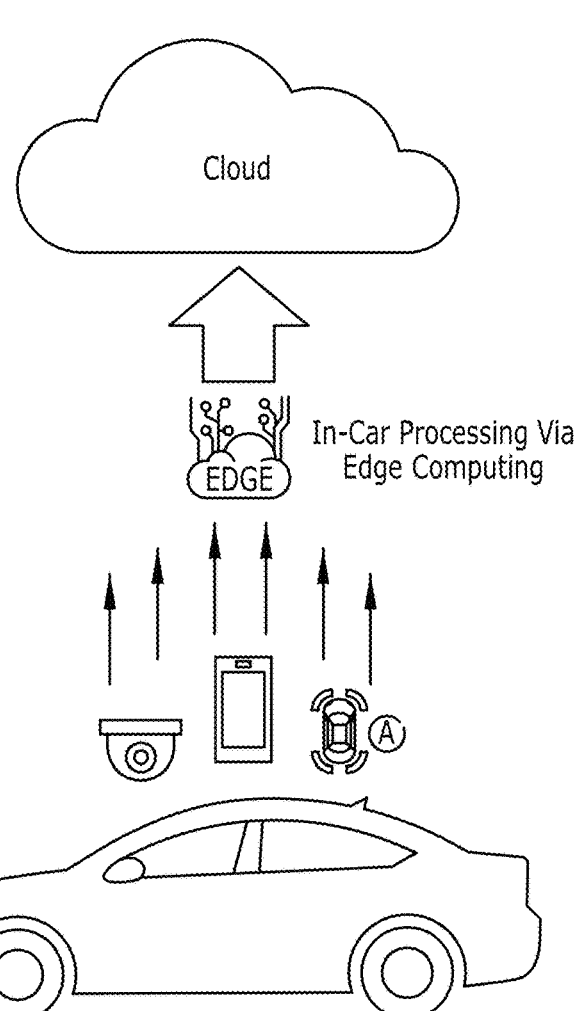
FIG. 2 illustrates a general overview of the components of the present disclosure.

The systems and methods of the present disclosure automatically generate a detailed analysis of a collision using multiple sensor data in or on the vehicle. The multiple sensor data (IMU, GPS, camera, LIDAR/RADAR) form the basis of sensor fusion. The processing of the sensor fusion data results in, but is not limited to, collision location, time of collision, single or multi-impact, details of collision object, severity of collision for ego vehicle and occupants, and sides of impact. The analysis of the collision using multiple sensor data is performed in-vehicle via edge system computing in near real-time. Once the detailed report is generated, it is sent to the cloud and/or the user's connected mobile device, significantly reducing time and cost associated with data processing, security, and storage, see FIG. 2.

Figure 3:
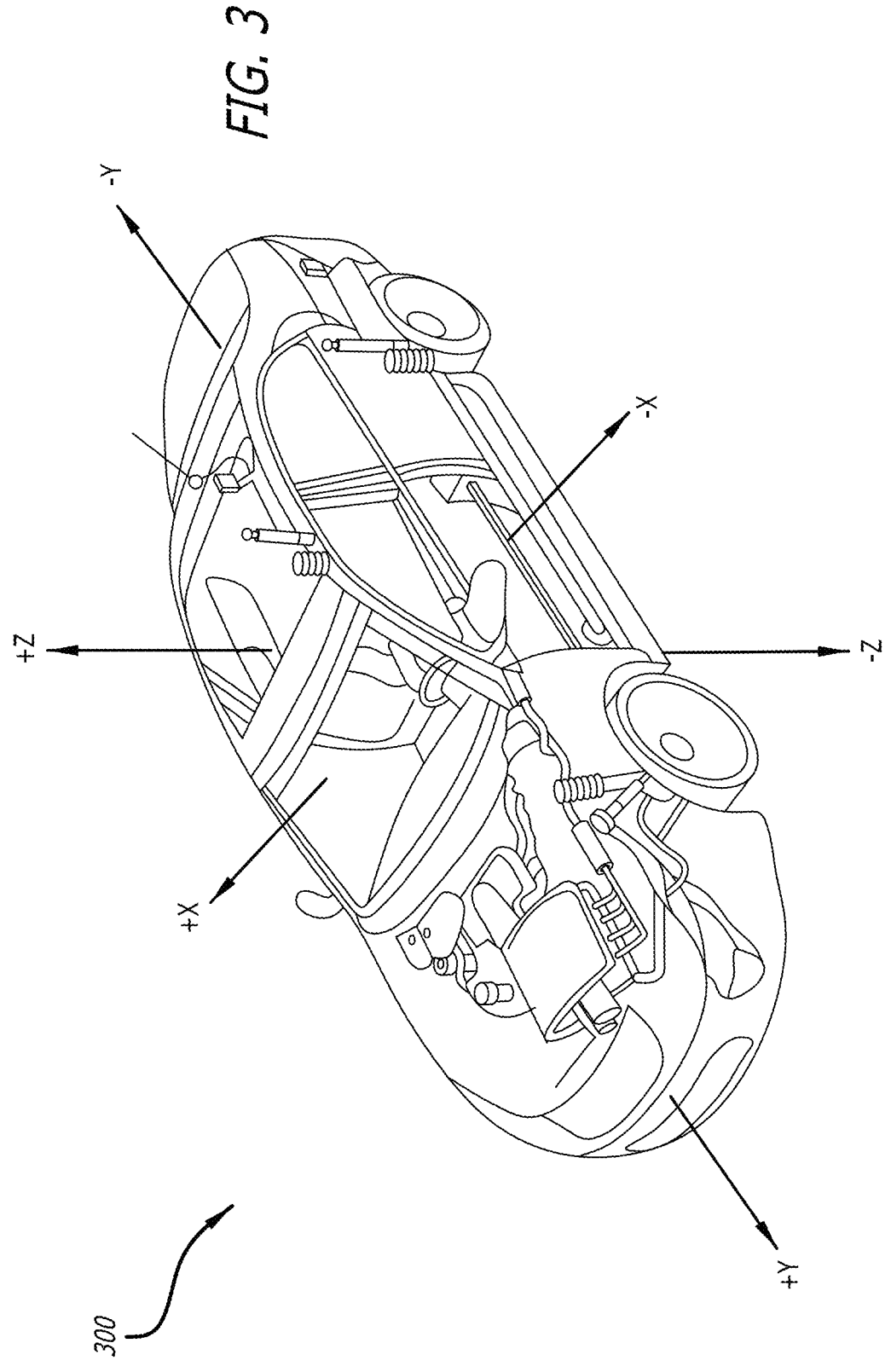
FIG. 3 illustrates general data capture of accelerometer sensors in a vehicle, according to one example.

FIG. 3 illustrates general data capture of accelerometer sensors in or on a vehicle, according to one example. The accelerometer is part of the Inertial Measurement Unit (IMU). The captured data may also be shared with other units and modules in the vehicle. The captured data may also be shared with the user's mobile device and the cloud. As shown, the IMU collects acceleration data including, but not limited to, longitudinal acceleration (+Y, −Y), lateral acceleration (+X, −X), and vertical acceleration (+Z, −Z). This collected data may then be sent to the IMU Sensor Processor for processing and identifying collisions based on predetermined threshold G values. Once processed, this data informs the direction and location of collision, and severity of collision. While the arrows in FIG. 3 provide one possible example of acceleration data collected, other deviations from this example are possible and within the scope of the present disclosure.

Figure 4:
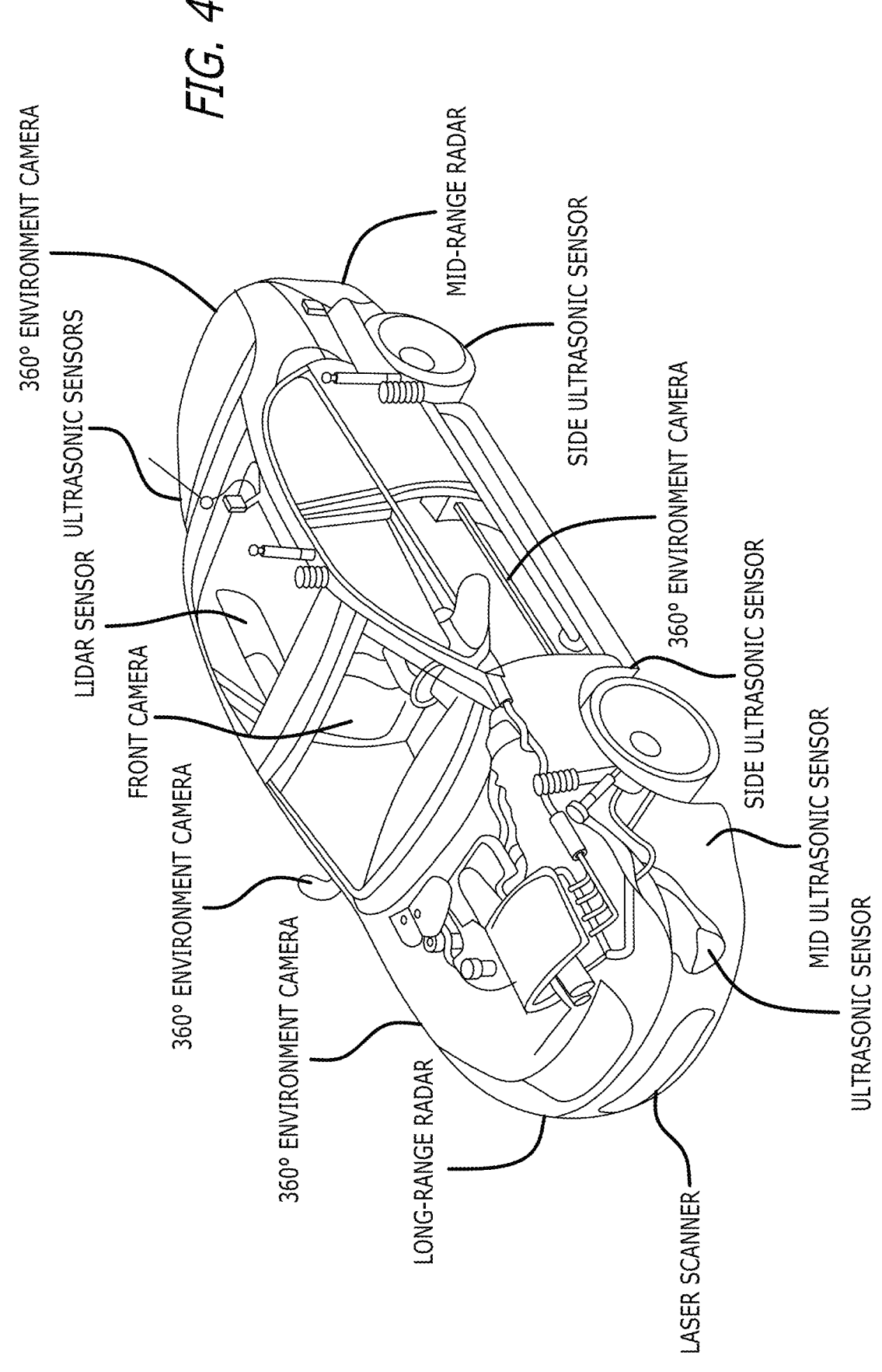
FIG. 4 illustrates an example of placement of sensors in a vehicle.

FIG. 4 illustrates an example of placement of sensors in or on a vehicle, although other deviations of the placement of sensors are possible and within the scope of the present disclosure. The sensors can include, but are not limited to, cameras for capturing images and video from all four quadrants of the vehicle, and sensors (such as, LIDAR/RADAR, and/or ultrasonic sensors) for detecting Time to Collision (TTC) and Distance to Collision (DTC) from all four quadrants (left, right, front, and rear) of the vehicle. According to one example, a front camera, multiple 360° environment cameras, a LIDAR sensor, one or multiple ultrasonic sensors, one or multiple RADAR sensors of varying ranges, one or multiple ultrasonic sensors, and one or multiple laser scanners may be utilized.

Figure 5:
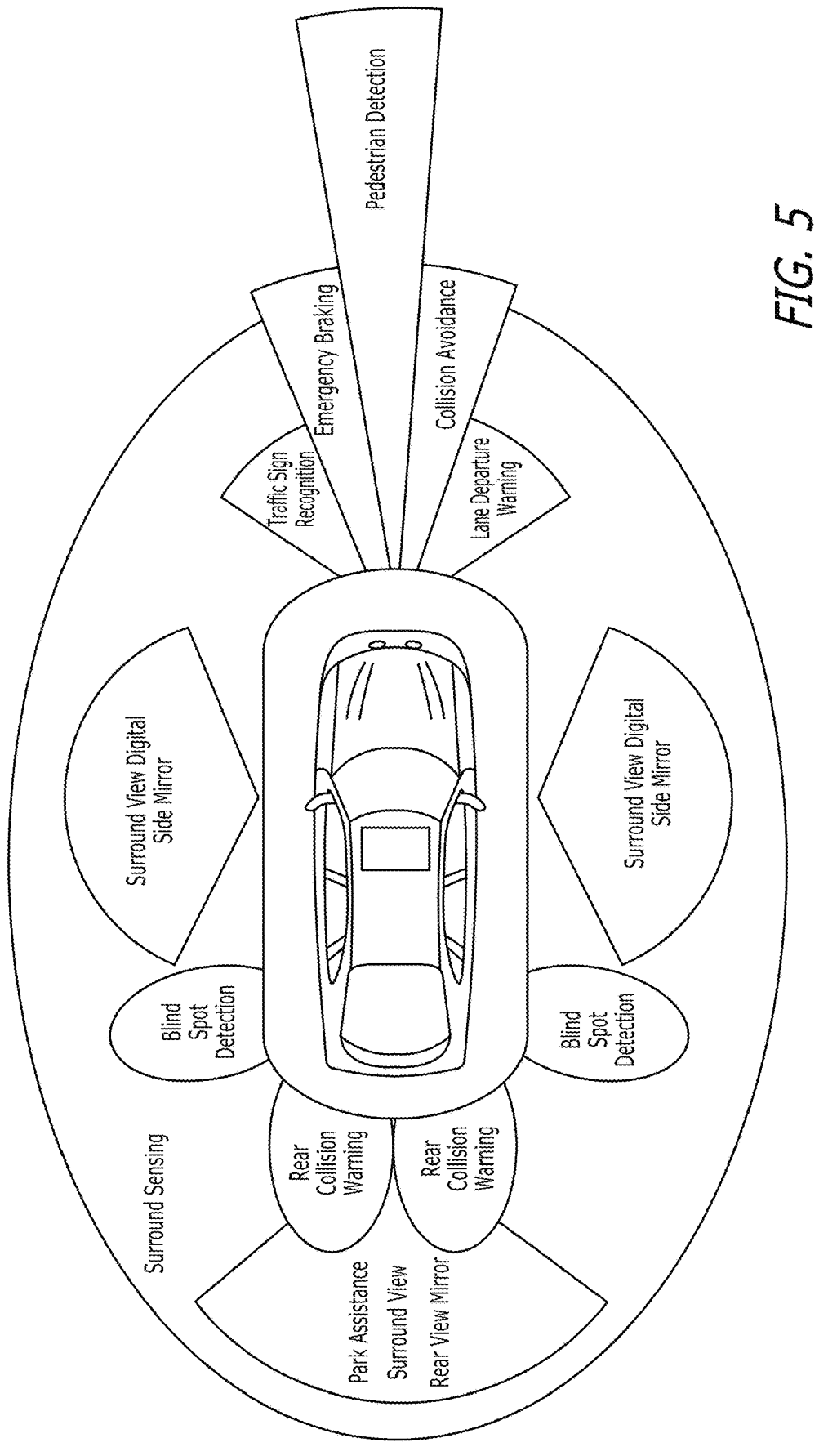
FIG. 5 illustrates an example of coverage area for possible sensors in a vehicle.

FIG. 5 illustrates an example of coverage area for possible sensors in or on the vehicle. The coverage areas may be larger or smaller depending on the type of sensor and the type of vehicle. Pedestrian detection and collision avoidance may be accomplished through long-range radar, ultrasonic sensors, or laser scanners. Traffic sign recognition and lane departure warnings may be accomplished through a front-view camera and computer vision. Cameras and ultrasonic/RADAR sensors may provide rear view and collision detection, respectively. Similarly, on the sides of the vehicle, cameras and ultrasonic/RADAR sensors may provide side view and collision detection, respectively. In any embodiment, the external sensors may be able to record images and time to collision (TTC)/distance to collision (DTC) from all four quadrants of the vehicle.

Sensor Fusion Architecture

Figure 6:
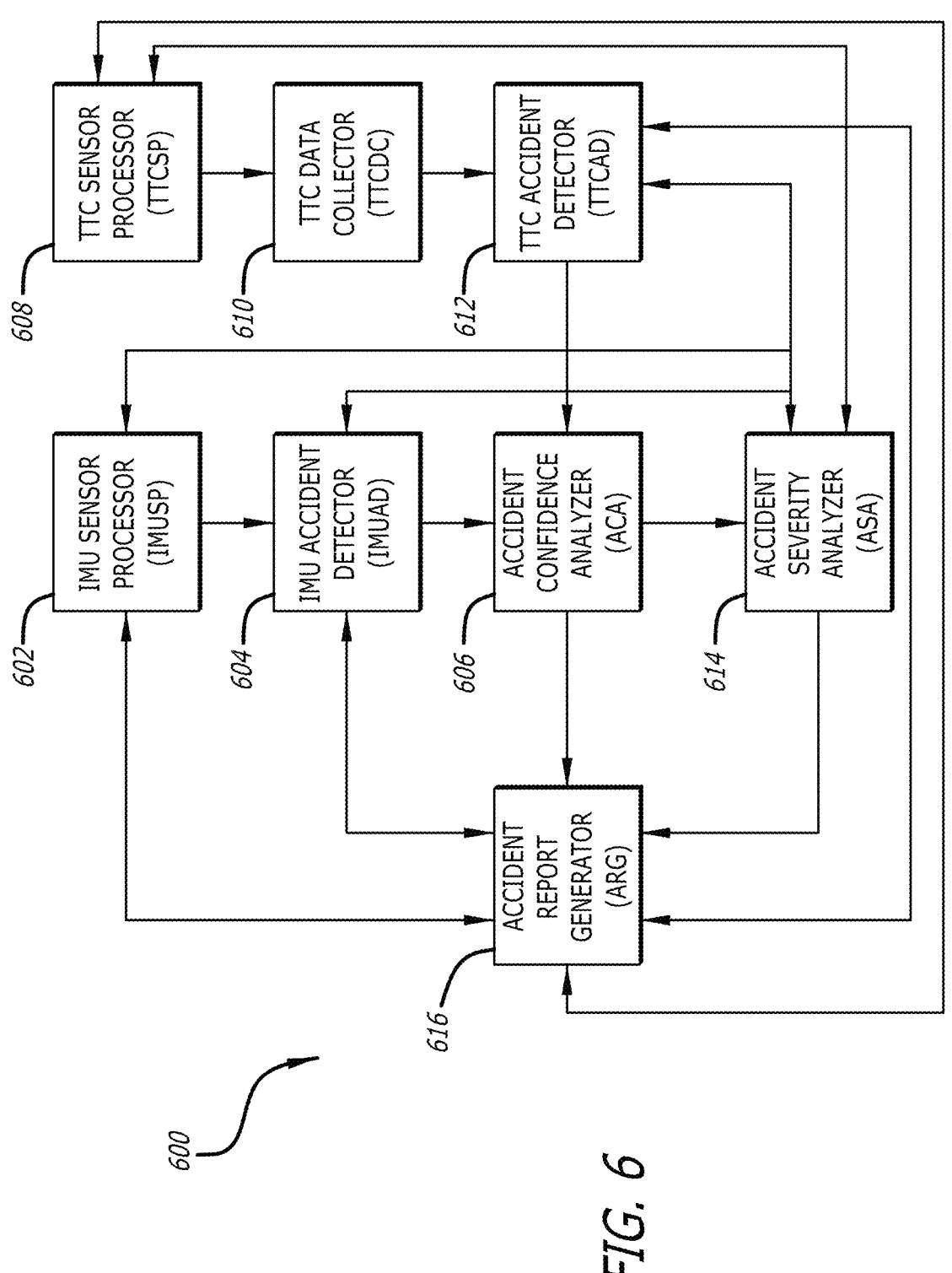
FIG. 6 illustrates an example architecture for sensor fusion-based collision and quadrant detection, and severity of accident determination within which embodiments of the systems and methods of the present disclosure may be found.

FIG. 6 illustrates an example architecture 600 for sensor fusion-based collision and quadrant detection, and severity of accident determination within which embodiments of the systems and methods of the present disclosure may be found. The system includes an Inertial Measurement Unit (IMU) Sensor Processor (IMUSP) 602 which processes data from an Inertial Measurement Unit (not shown). The IMU may collect data along nine (9) axes, that may include, but are not limited to, longitudinal acceleration (forward/backward acceleration), lateral acceleration (left/right acceleration), vertical/normal acceleration (up/down acceleration), rotational velocity (angular velocity), longitudinal magnetic field, lateral magnetic field, and vertical magnetic field. The IMUSP 602 processes this data, along with the Controller Area Network (CAN) data located on the vehicle, and GPS, and continuously stores the data in the vehicle system memory.

An IMU Accident Detector (IMUAD) 604 may continuously check the IMUSP's data for signs of an accident, such as an acceleration event too high to result from normal driving. When the IMUAD 604 detects a potential collision, it determines which quadrant (front, rear, left, right) of the vehicle the accident occurred in by determining the direction of the acceleration. The data is then saved in storage or memory in the vehicle system and a message is sent to an Accident Confidence Analyzer (ACA) 606 to process the data.

Simultaneous to the IMU sensors, the various sensors (such as radio wave sensors, light wave sensors, image sensors, etc.), may be continuously collecting data. Using various sensors (such as RADAR, LIDAR, computer vision, etc. not shown), a TTC Sensor Processor (TTCSP) 608 may compute or determine various data. This data includes, but is not limited to:

Speed and direction of the target objects relative to the ego vehicle in each quadrant (front, rear, left, right) of the vehicle.

An analysis of the type of object for each target object (vehicle and class, pedestrian, wall, etc.).

Lane position of the ego vehicle.

Ego vehicle passenger count and positions.

Ego vehicle passenger seatbelt statuses.

Distance of each target object to the ego vehicle (DTC) in each quadrant.

Expected time until collision (TTC) in each quadrant.

Whether the ego vehicle had recently run a red light or failed to stop at a stop sign.

Whether the driver of the ego vehicle was distracted by a mobile device (cell phone).

Ego vehicle speed.

As there is a large amount of data to be processed, the TTCSP 608 runs with a low frequency until signaled by a Time to Collision Data Collector (TTCDC) 610. The TTCDC 610 runs continuously and reads the data from the TTCSP 608 to determine when an accident is imminent. When the TTCDC 610 determines that an accident is imminent (i.e., a combination of the time to collision and distance to collision are below a pre-determined threshold), the TTCDC 610 may signal the TTCSP 608 to capture the data at a high frequency and starts writing the data from the TTCSP 608 to memory in the vehicle system memory.

A TTC Accident Detector (TTCAD) 612 may continuously check the TTCDC 610 for new data. The TTCAD 612 uses the DTC to determine whether an accident occurred. If a potential accident is detected, the TTCAD 612 sends a message to the Accident Confidence Analyzer (ACA) 606 to process its data.

The ACA 606 may incorporate the data from the IMUAD 604 and TTCAD 612 to determine whether a traffic accident occurred. If the ACA 606 determines an accident has occurred, the ACA 606 stores the relevant data in the vehicle system memory and sends a message to an Accident Severity Analyzer (ASA) 614. The Accident Severity Analyzer (ASA) 614 may utilize the data from the IMUSP 602, IMUAD 604, TTCSP 608, and TTCAD 612 to determine the severity of the accident on 3 axes. For example: Passengers in the ego vehicle; Passengers in the target vehicle/object (when relevant); and Deformation damage to the vehicles/objects involved for each quadrant, if applicable.

The ASA 614 then sends a message to an Accident Report Generator (ARG) 616. The ARG 616 may then incorporate the data from the IMUSP 602, ASA 614, ACA 606, IMUAD 604, TTCAD 612, and TTCSP 608 to generate an accident report. The ARG 616 then saves this report to local storage and sends the report to the cloud and the user's connected device (e.g. mobile device).

Inertial Measurement Unit Sensor Processor (IMUSP)

Figure 7:
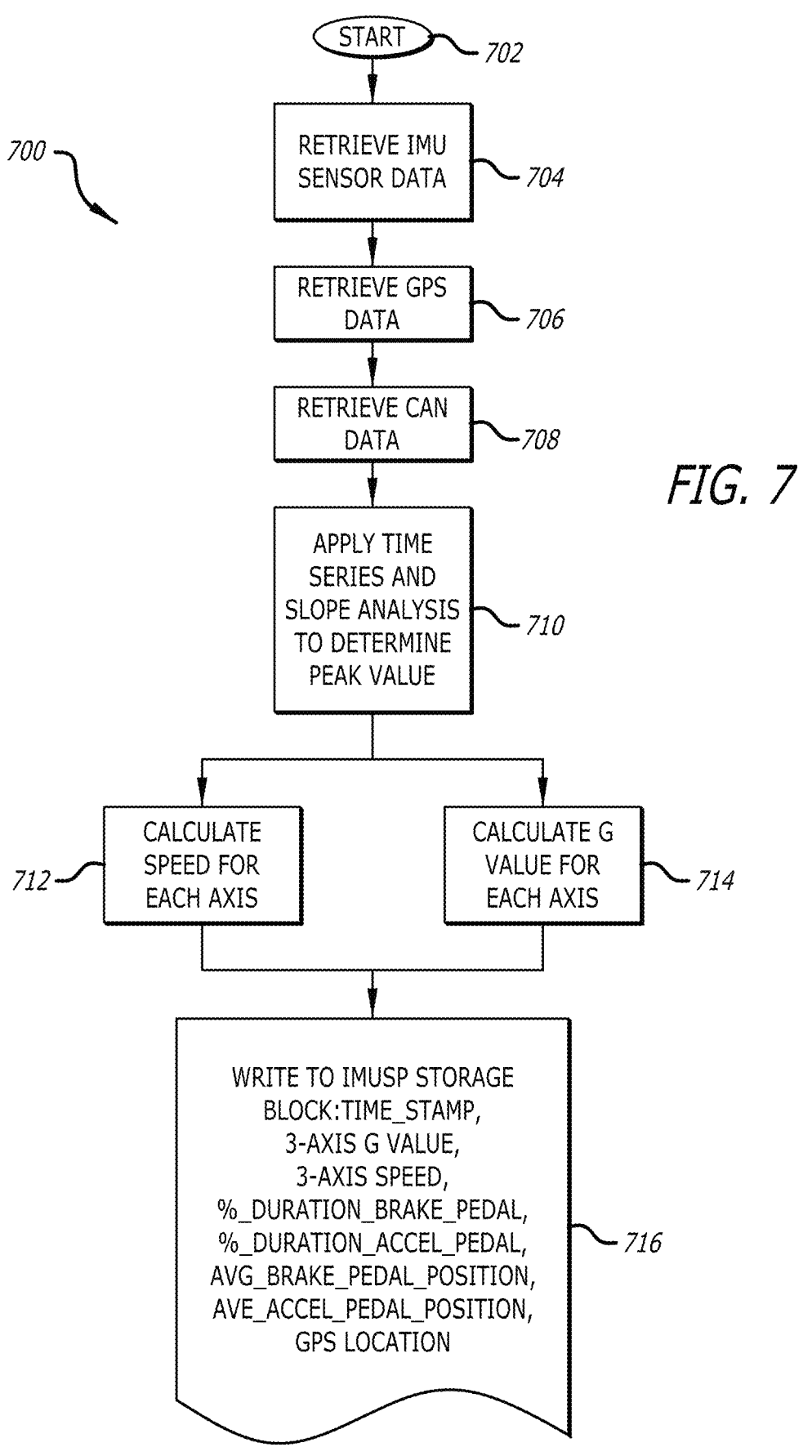
FIG. 7 illustrates a flow diagram illustrating the operations of the Inertial Measurement Unit (IMU) Sensor Processor (IMUSP) which is responsible for retrieving, calculating, and writing data that is used by the IMU Accident Detector (IMUAD), Accident Report Generator (ARG), and Accident Severity Analyzer (ASA) when a high-G event is detected.
Figure 8A:
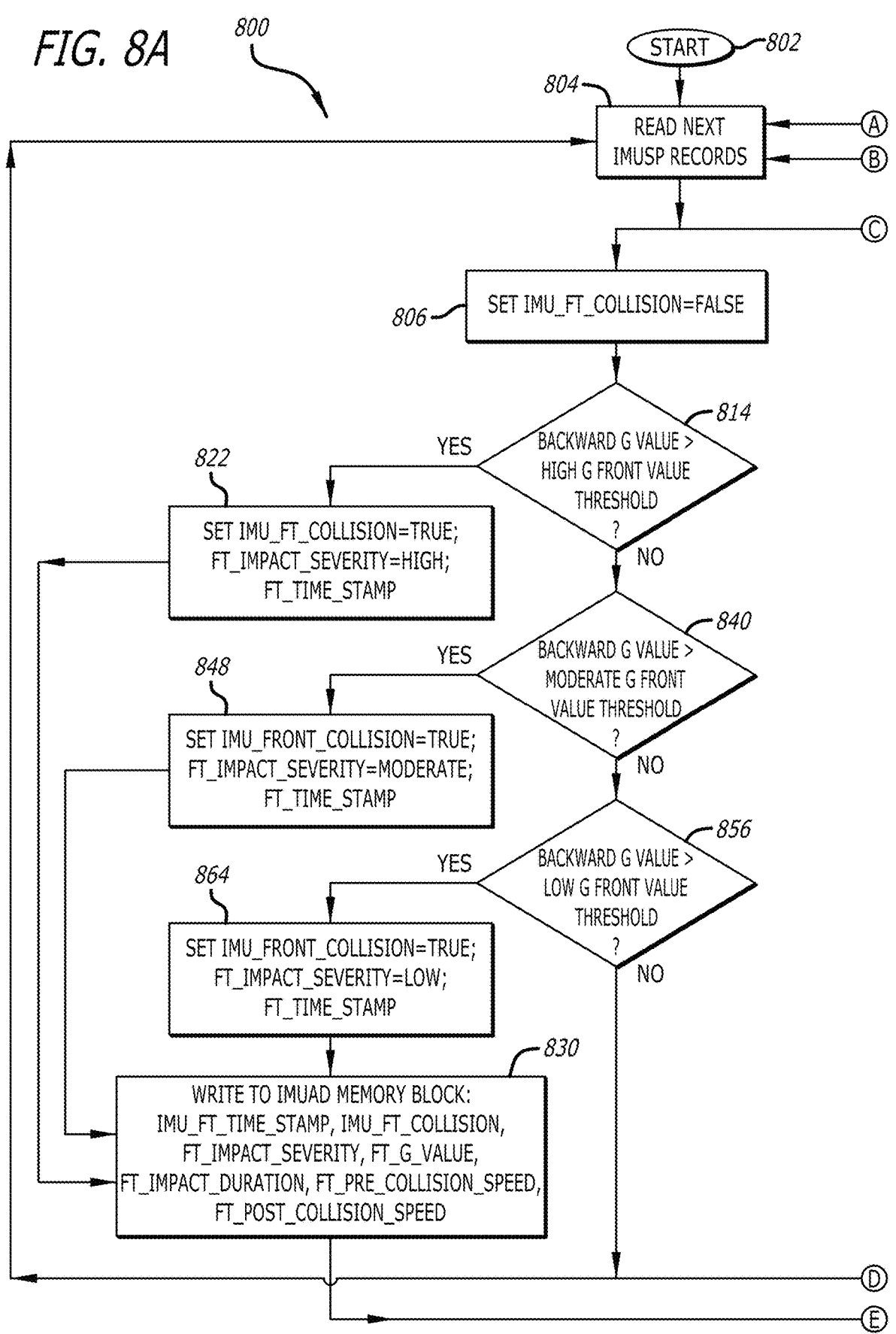
FIGS. 8A-8D are a flow diagram illustrating the operations of the IMU Accident Detector (IMUAD).
Figure 8B:
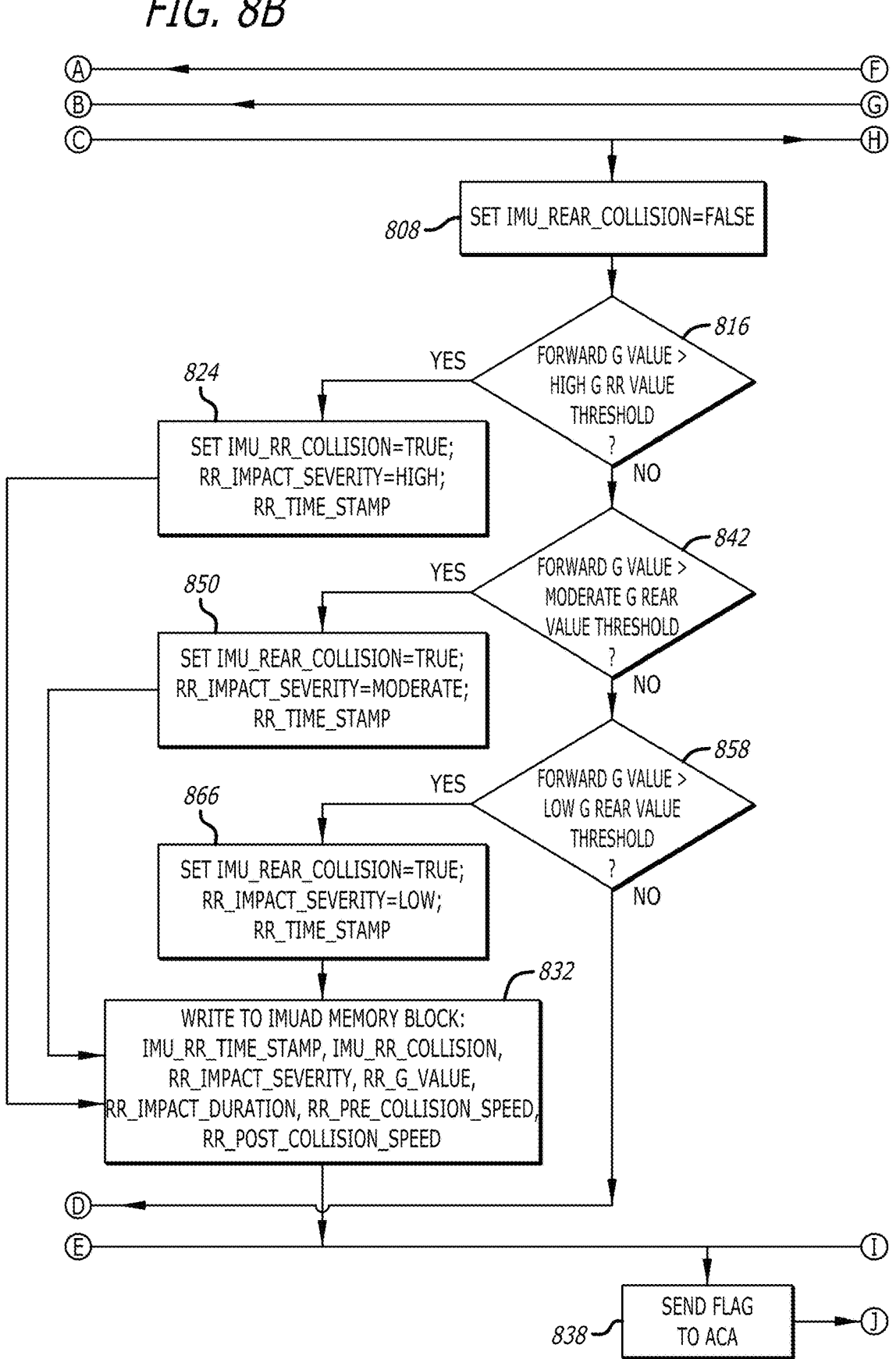
Figure 8C:
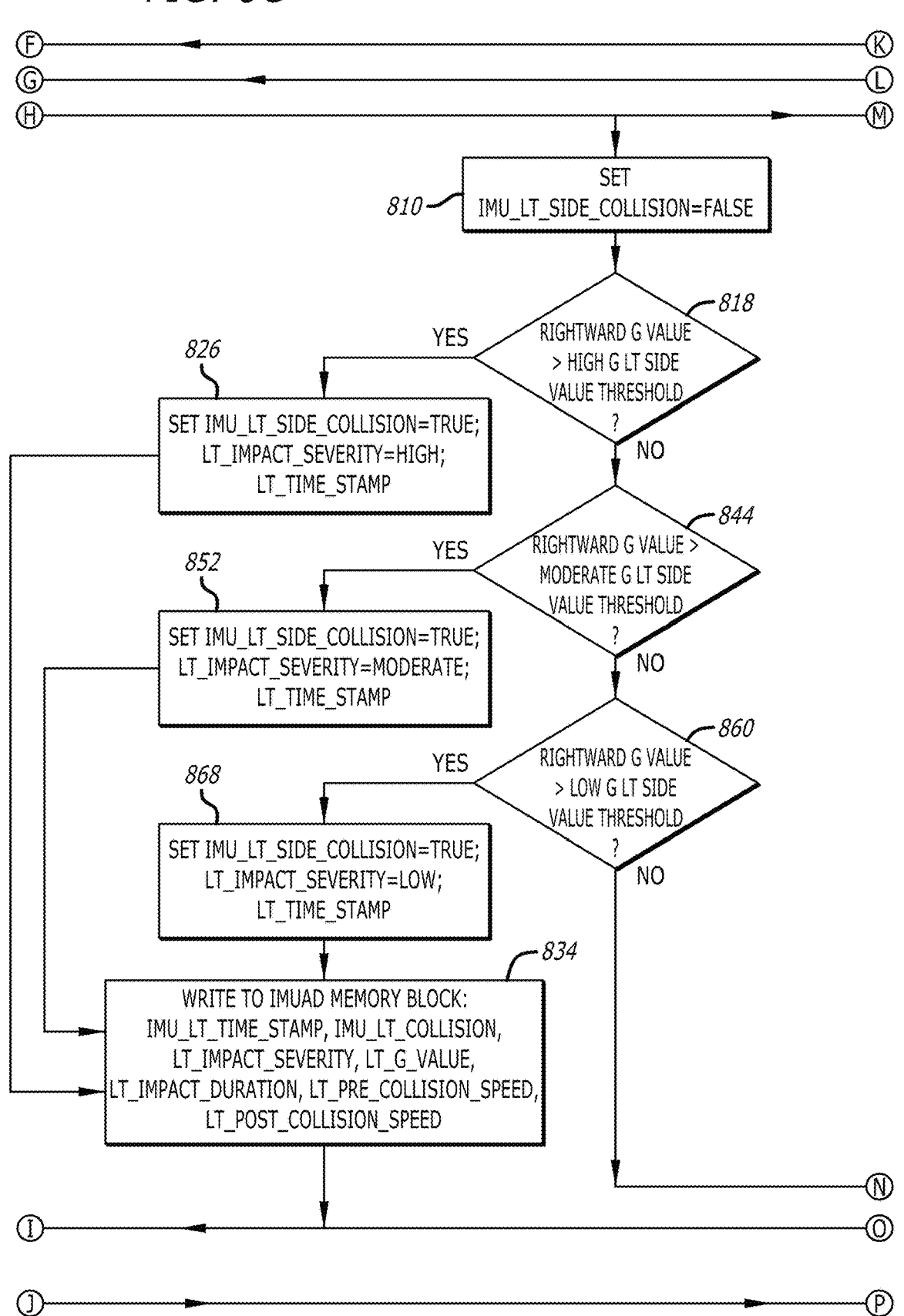
Figure 8D:
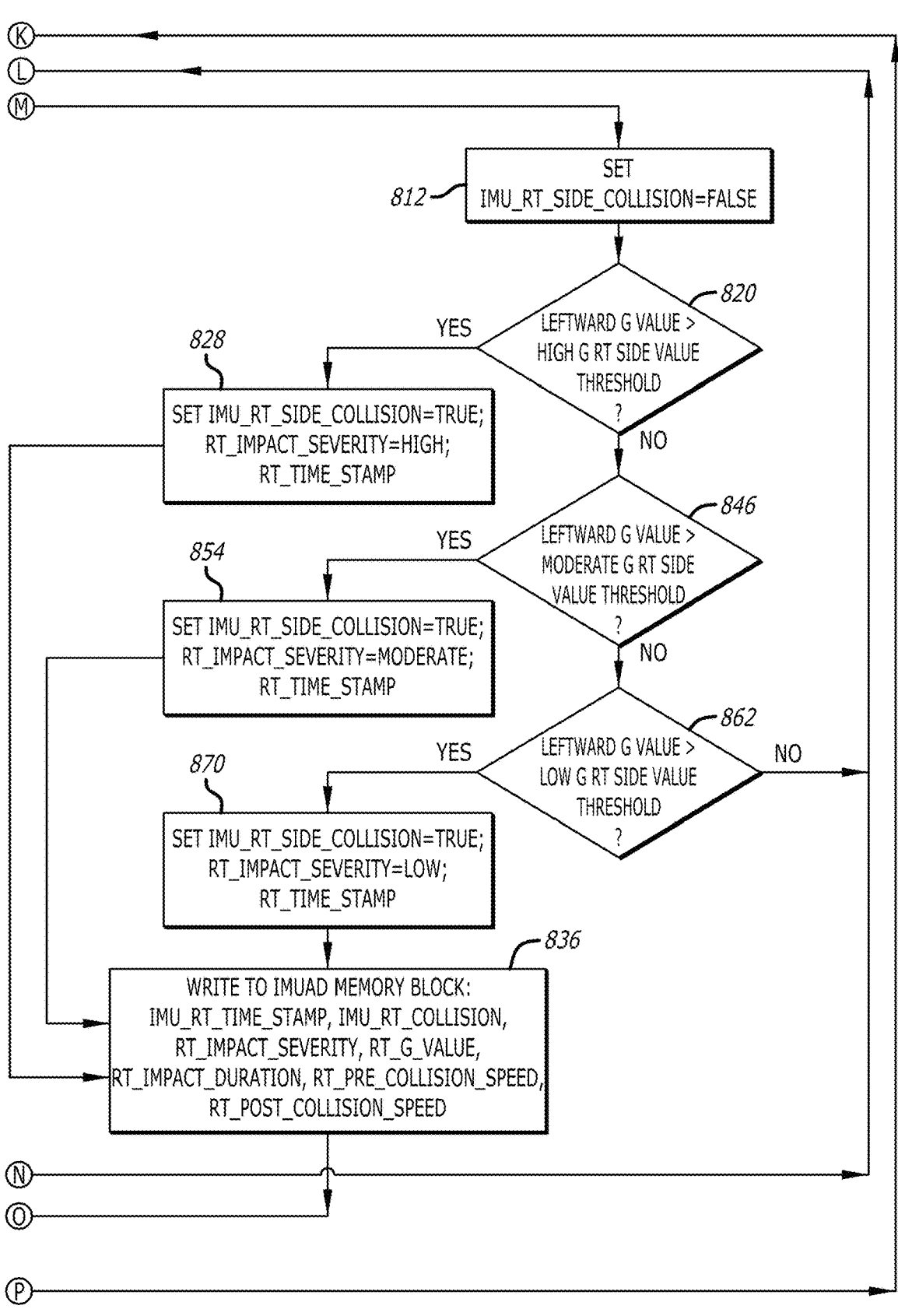

FIG. 7 illustrates a flow diagram illustrating the operations of the Inertial Measurement Unit (IMU) Sensor Processor (IMUSP) which is responsible for retrieving, calculating, and writing data that is used by the IMU Accident Detector (IMUAD), Accident Report Generator (ARG), and Accident Severity Analyzer (ASA) when a high-G event is detected 700. When the vehicle is started 702, data is retrieved from IMU sensors 704, GPS 706, and CAN 708. The data is analyzed using time series and slope analysis to determine values including, but not limited to, peak and moving average values 710. That is, the speed for each axis (latitudinal, longitudinal, and vertical coordinates) 712 and G values on each axis (latitudinal, longitudinal, and vertical coordinates) 714 are calculated. Once calculated, the values 716 are written to the internal storage block. The values can include, but are not limited to:

Time stamp.

3-axis G value.

3-axis speed.

Percent (%) duration brake pedal.

Percent (%) duration acceleration pedal.

Average brake pedal position.

Average acceleration pedal position.

GPS location.

Rate of change of acceleration (jerk).

The IMUSP may run continuously and write and store data on a preconfigured interval.

Inertial Measurement Unit Accident Detector

FIGS. 8A-8D illustrate a flow diagram illustrating the operations of the IMU Accident Detector (IMUAD) 800. The IMUAD 802 is started when the vehicle is started and continuously reads the next available record from the Inertial Measurement Unit (IMU) Sensor Processor (IMUSP) 804. Upon reading the next available record, the IMUAD sets the collision flags for the front 806, rear 808, left 810, and right sensors 812 to False, effectively resetting itself and operating under the assumption there is no collision.

Using parallel processing for the front, rear, left, and right sensors, the IMUAD then checks if any G value is greater than a preconfigured High threshold for one or more of the sensors 814, 816, 818, 820. If any G value meets the condition, the IMU xx collision flag (where xx is one of FT, RR, LT, RT, denoting front, rear, left, or right, respectively) is set to True and the severity flag is set to High 822, 824, 826, 828. The IMUAD then writes 830, 832, 834, 836 the following information (heretofore referred to as IMUAD report data) from each of the front, rear, left, and right sensors that exceed the threshold to its memory block:

IMU xx time stamp.

IMU xx collision.

xx impact severity.

xx G value.

xx impact duration.

xx pre collision speed.

xx post collision speed.

Note: xx is one of FT, RR, LT, RT denoting front, rear, left or right, respectively.

Once the data is written to the memory block, the IMUAD sends a flag 838 to the Accident Confidence Analyzer (ACA) for further review. It then reads the next IMUSP record 804 and repeats the process.

If no G values meet the High threshold condition, the IMUAD checks if any G value is greater than a preconfigured Moderate threshold for one or more of the sensors 840, 842, 844, 846. If any G value meets the condition, the IMU xx collision flag (where xx is one of FT, RR, LT, RT) is set to True and the severity flag is set to Medium 848, 850, 852, 854. The IMUAD then writes the IMUAD report data from each of the front, rear, left, and right sensors that exceed the threshold to its memory block 830, 832, 834, 836. Once the data is written to the memory block, the IMUAD sends a flag to the Accident Confidence Analyzer (ACA) 838 for further review. It then reads the next IMUSP record 804 and repeats the process.

If no G values meet the High or Moderate threshold condition, the IMUAD checks if any G value is greater than a preconfigured Low threshold for one or more of the sensors 856, 858, 860, 862. If any G value meets the condition, the IMU xx collision flag (where xx is one of FT, RR, LT, RT) is set to True and the severity flag is set to Low 864, 866, 868, 870. The IMUAD then writes the IMUAD report data from each of the front, rear, left, and right sensors that exceed the threshold to its memory block 830, 832, 834, 836. Once the data is written to the memory block, the IMUAD sends a flag 838 to the Accident Confidence Analyzer (ACA) for further review. It then reads the next IMUSP record 804 and repeats the process.

If no G values meet the High, Moderate, or Low threshold conditions, the IMUAD reads the next IMUSP record 804 and repeats the process.

Time To Collision Data Collector (TTCDC)

Figure 9A:
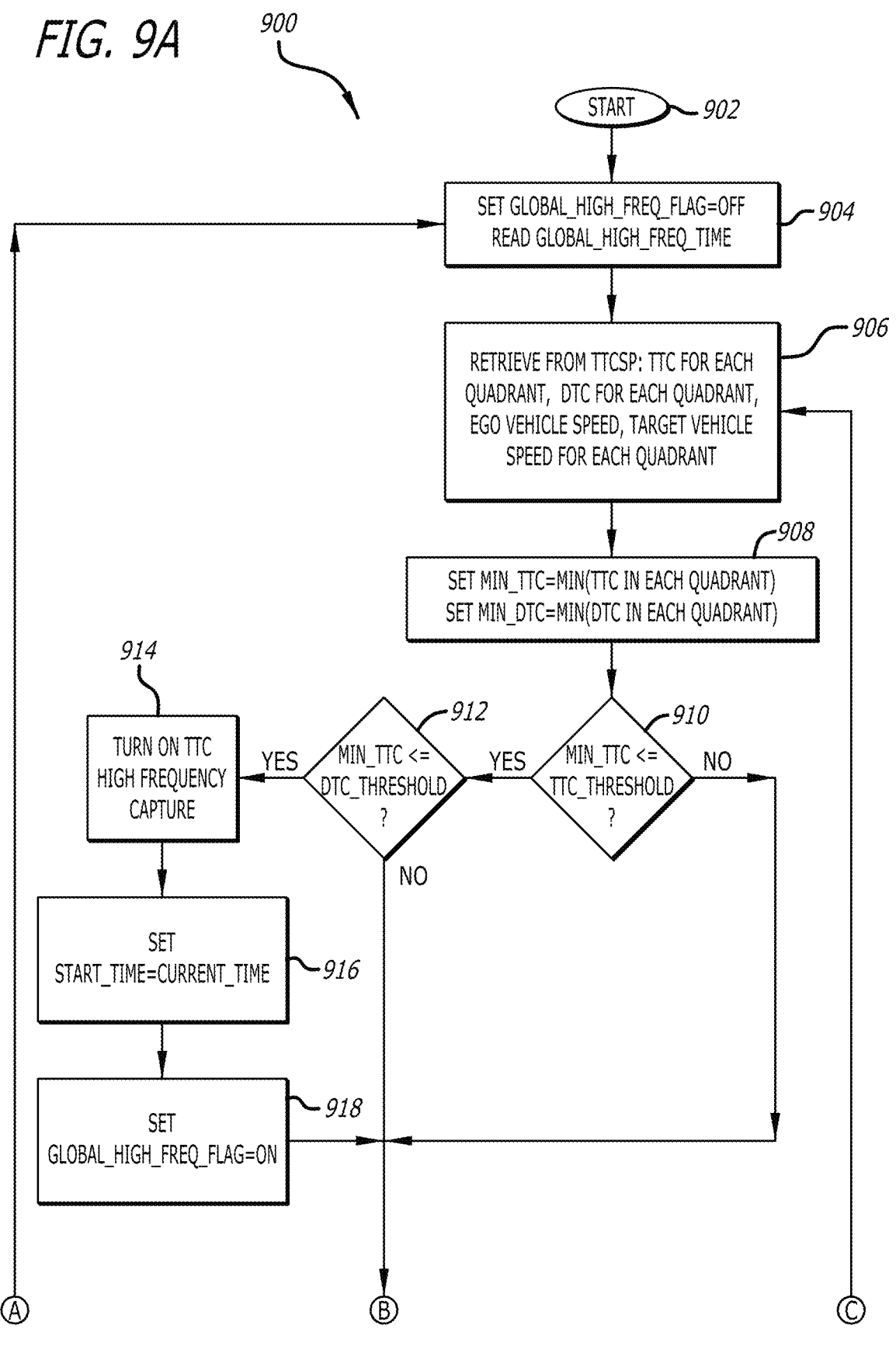
FIGS. 9A and 9B are a flow diagram illustrating the operations of the Time to Collision Data Collector (TTCDC)
Figure 9B:
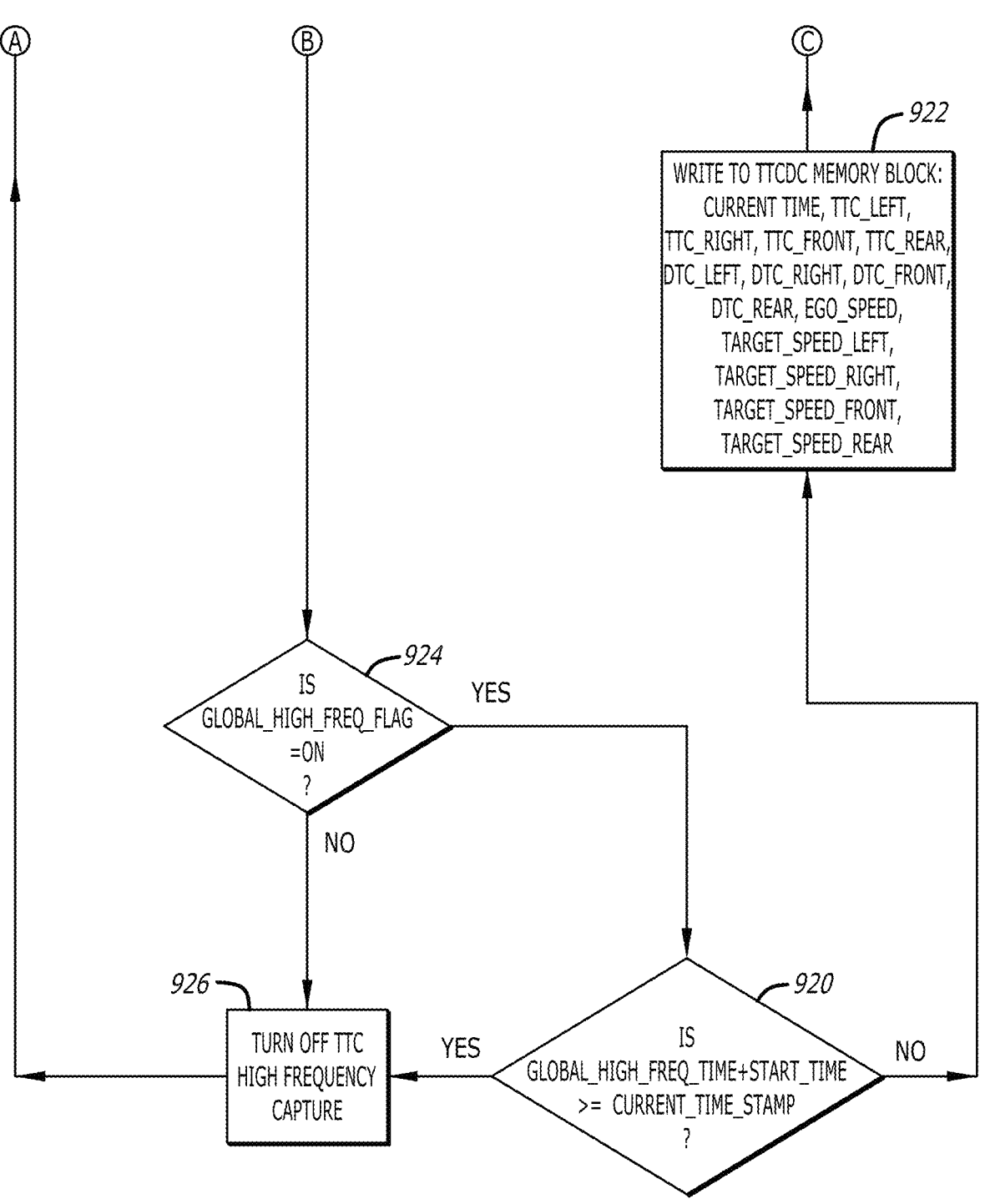
Figure 10A:
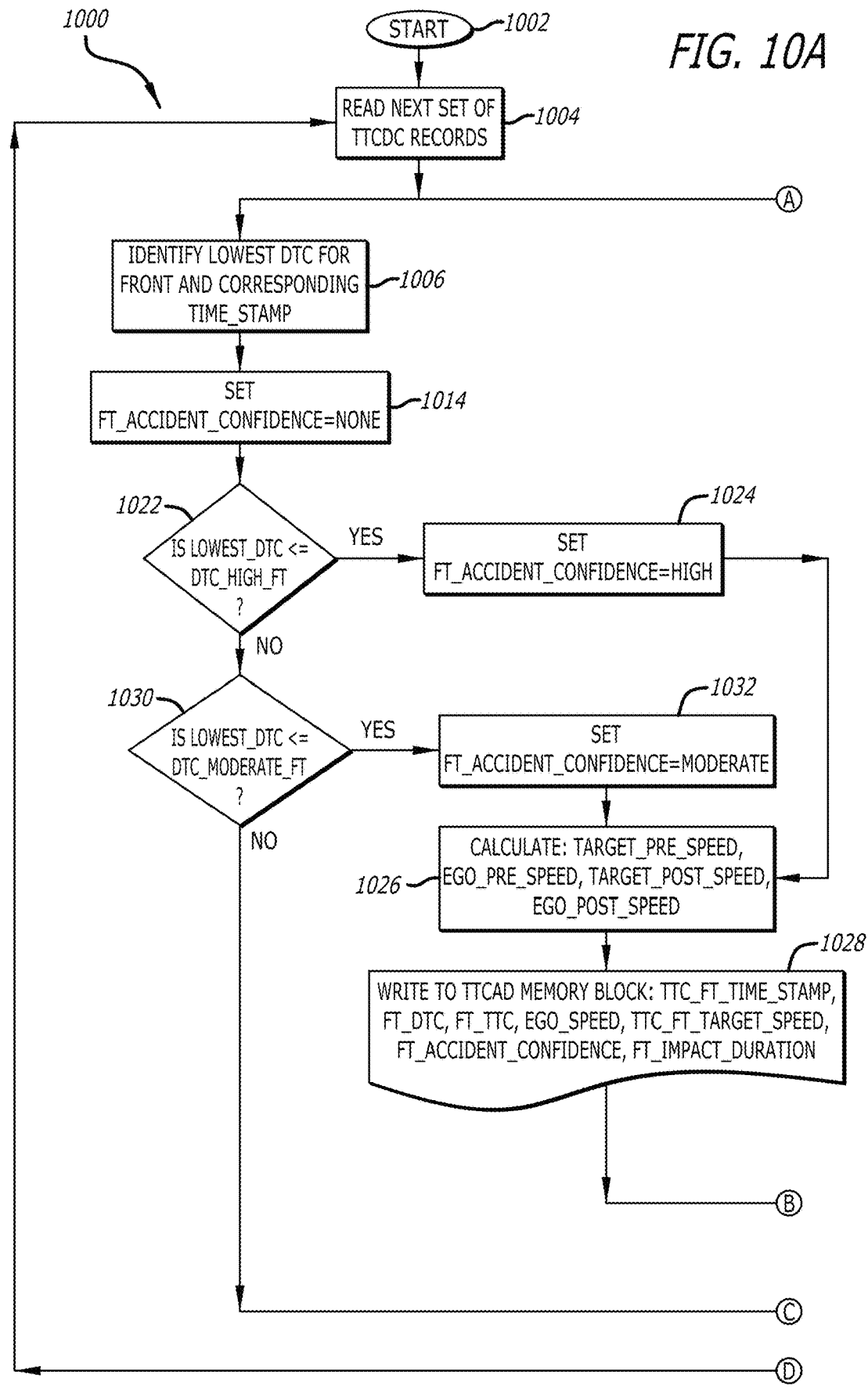
FIGS. 10A-10D are a flow diagram illustrating the operations of the Time to Collision Accident Detector (TTCAD).
Figure 10B:
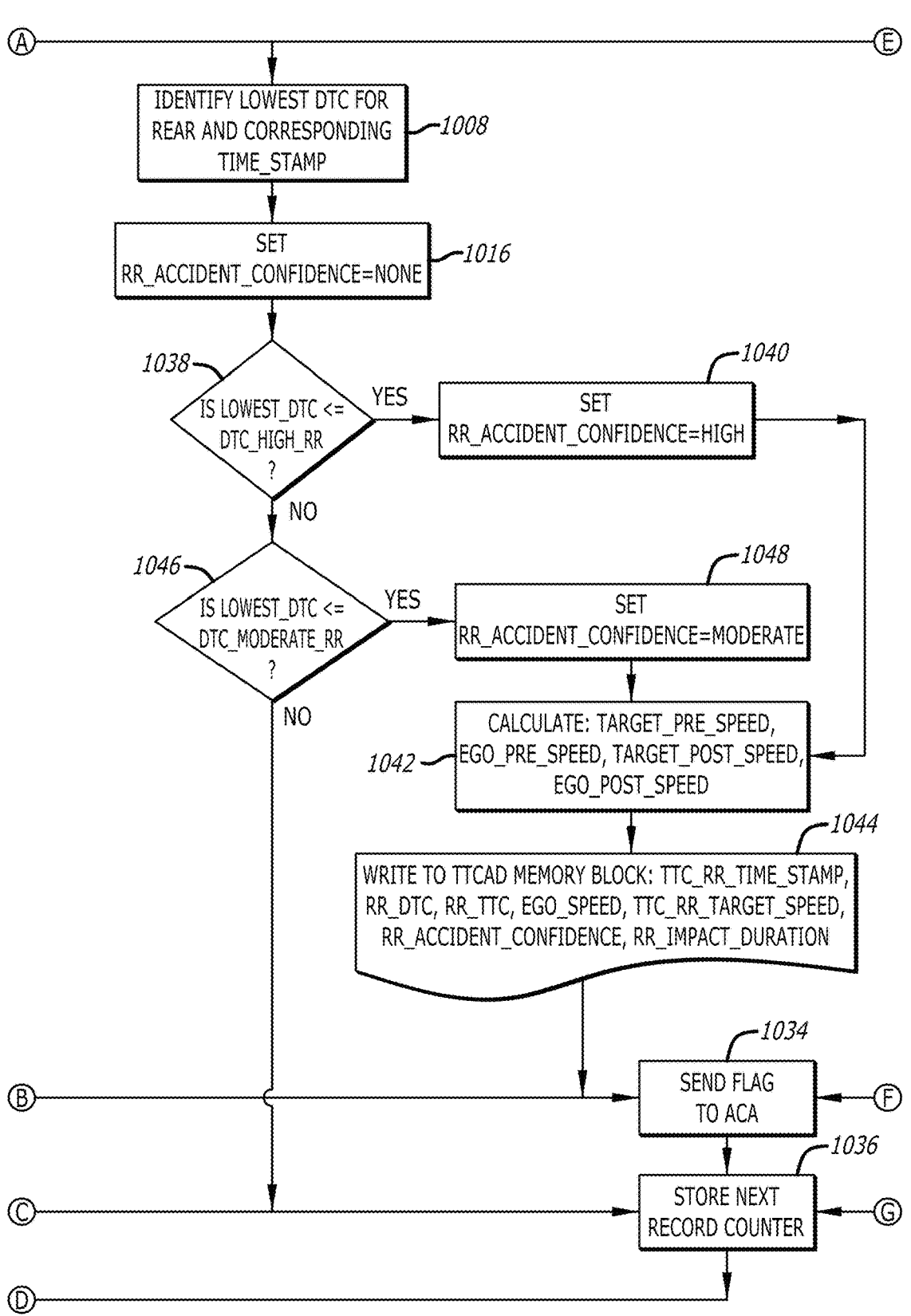
Figure 10C:
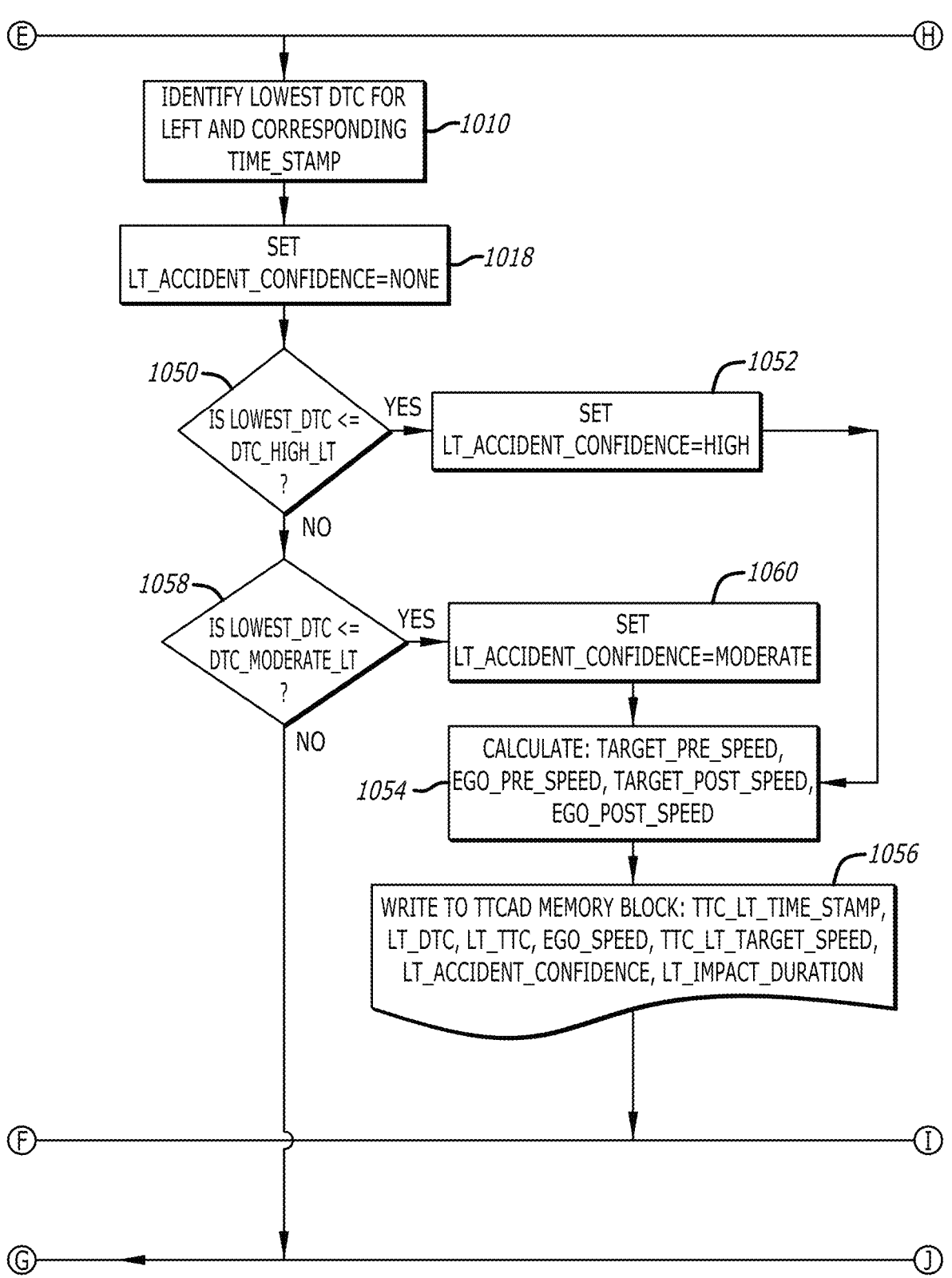
Figure 10D:
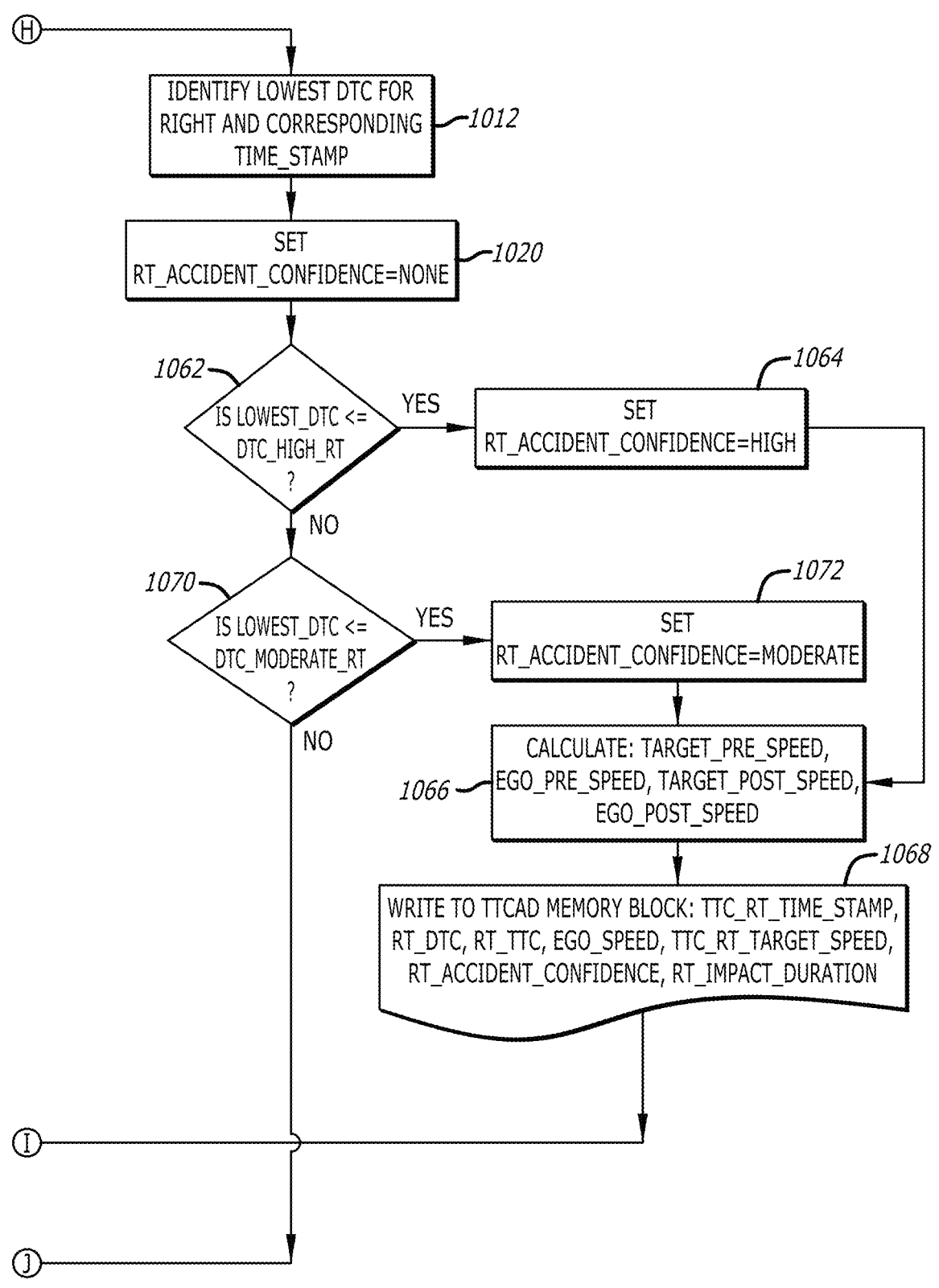
Figure 11A:
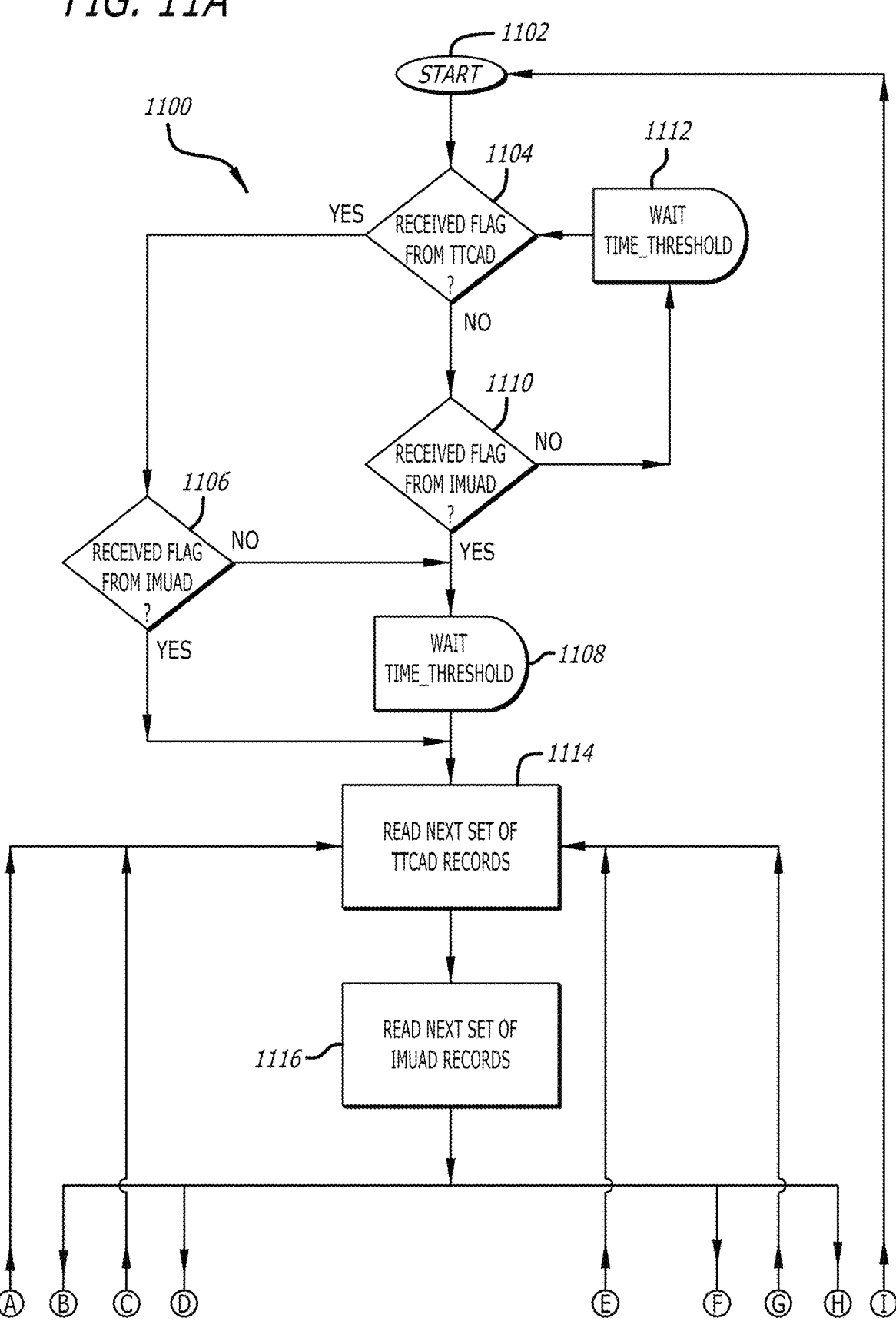
FIGS. 11A-11E are a flow diagram illustrating the operations of the Accident Confidence Analyzer (ACA).
Figure 11B:
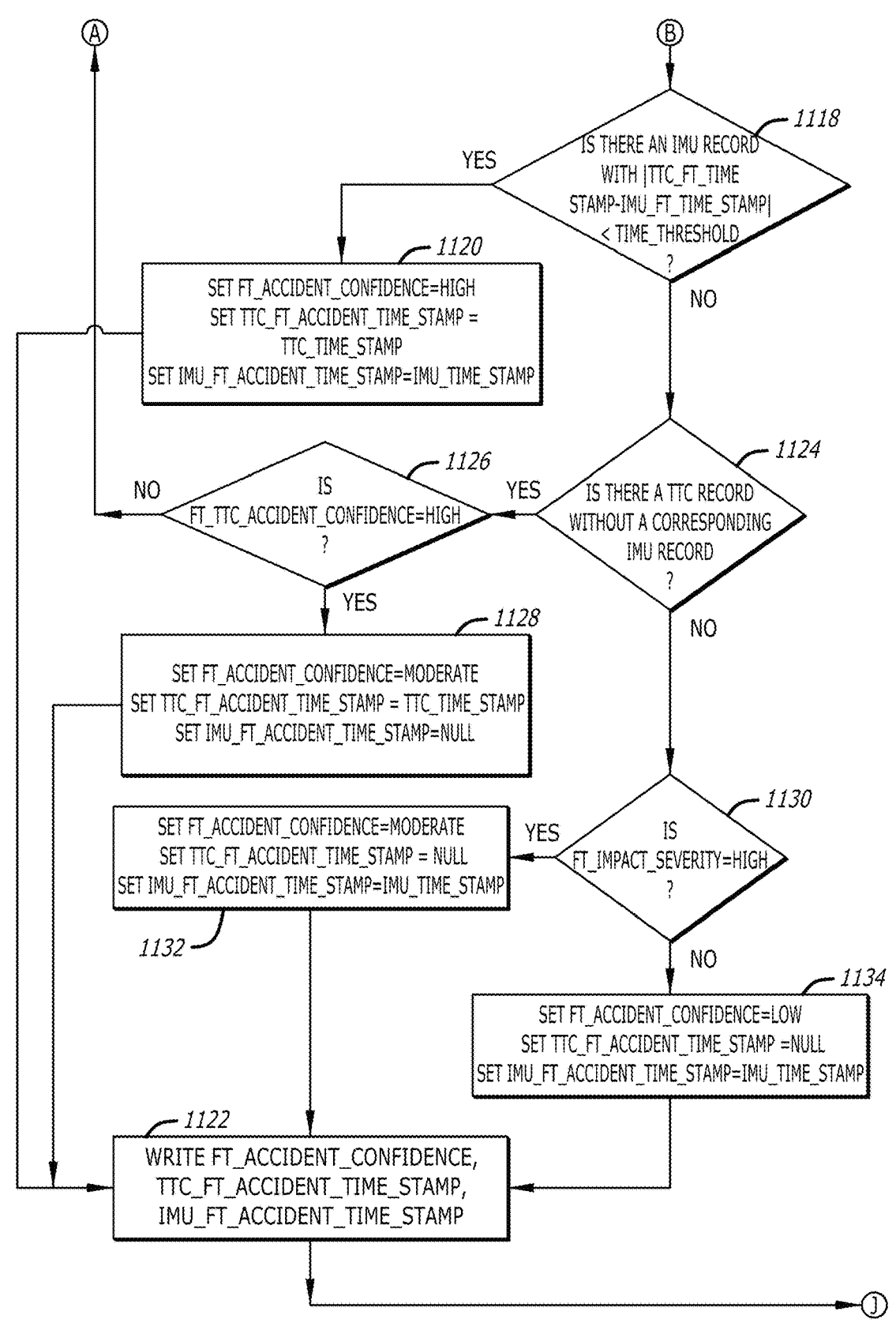
Figure 11C:
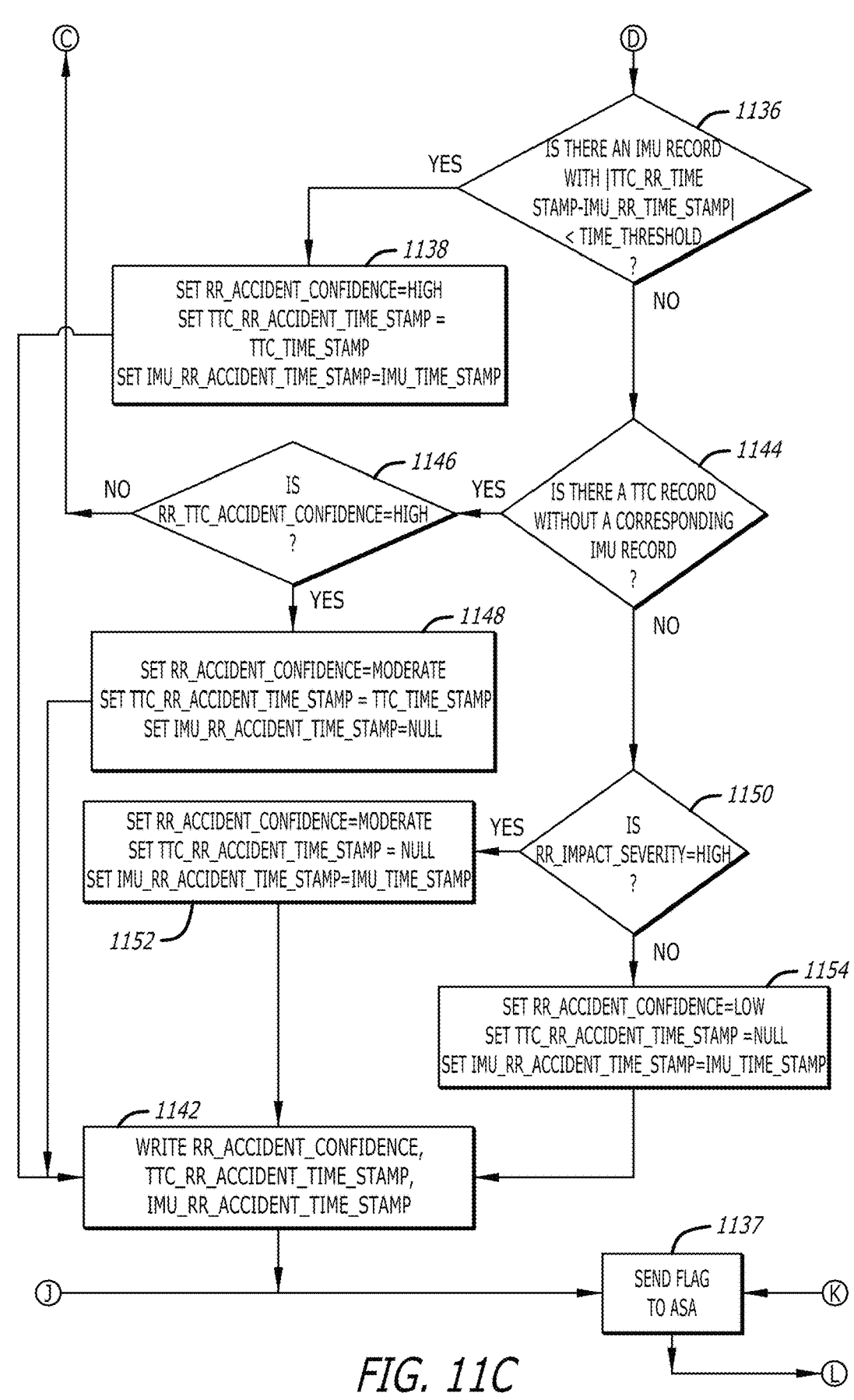
Figure 11D:
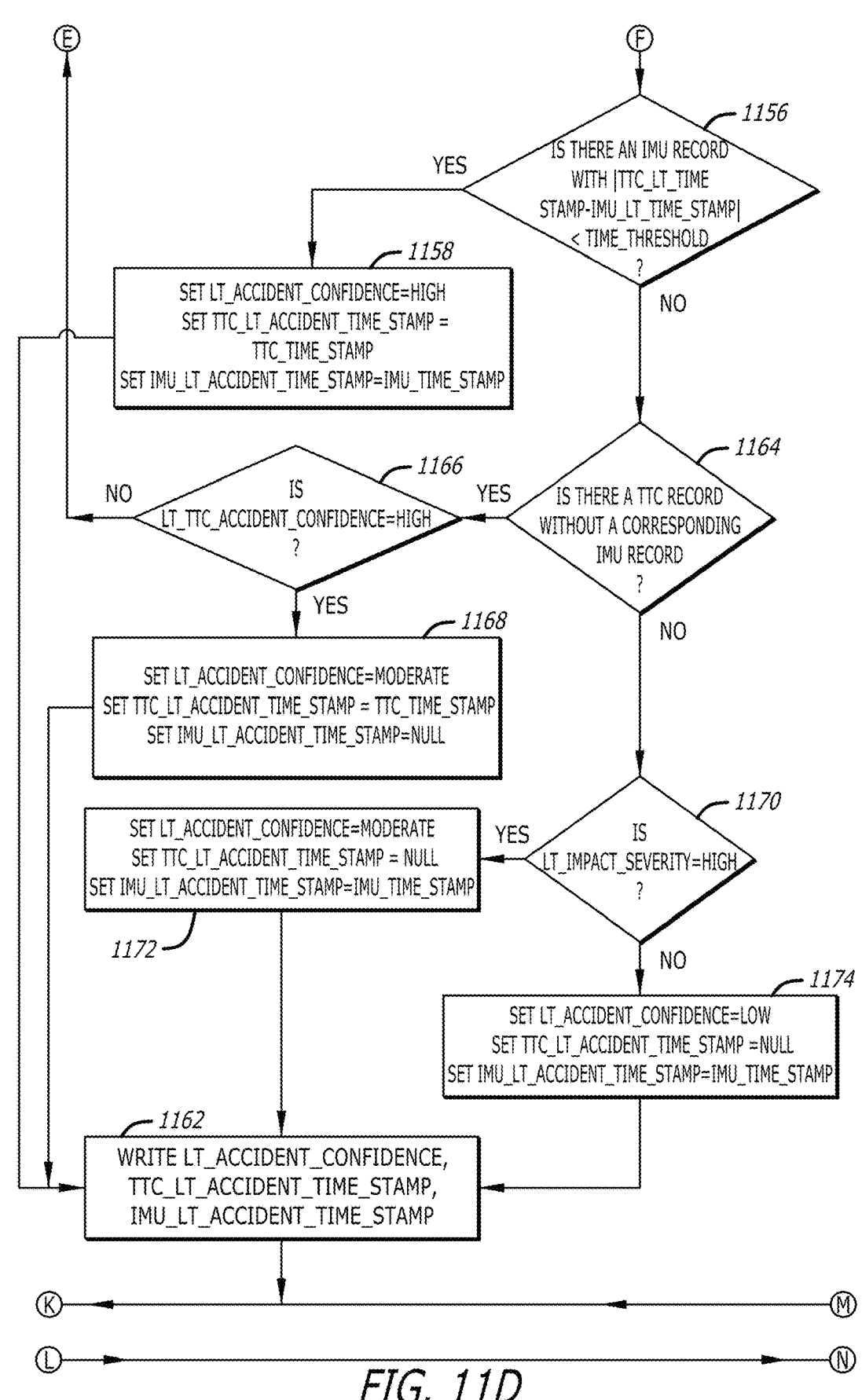
Figure 11E:
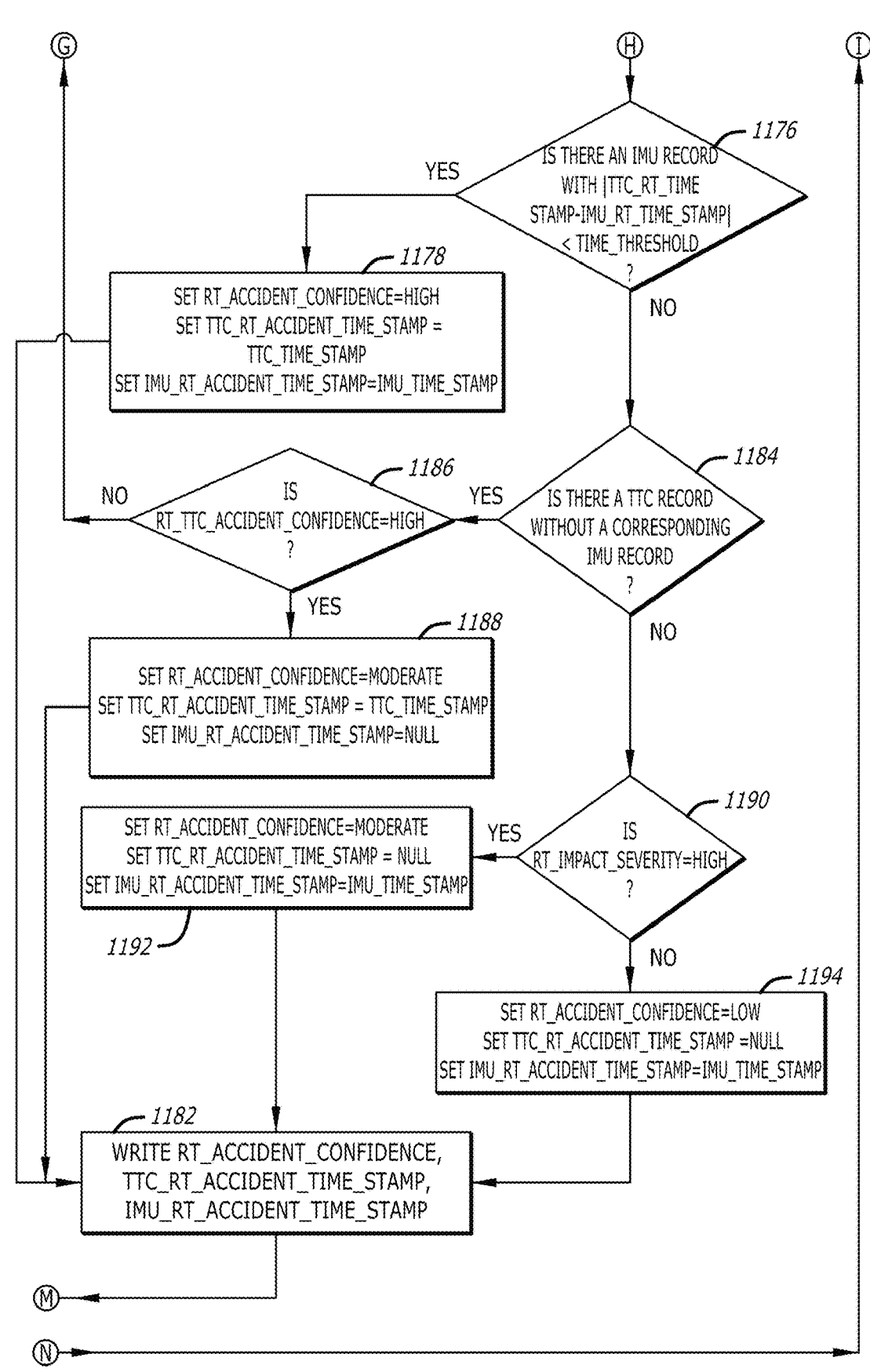
Figure 12B:
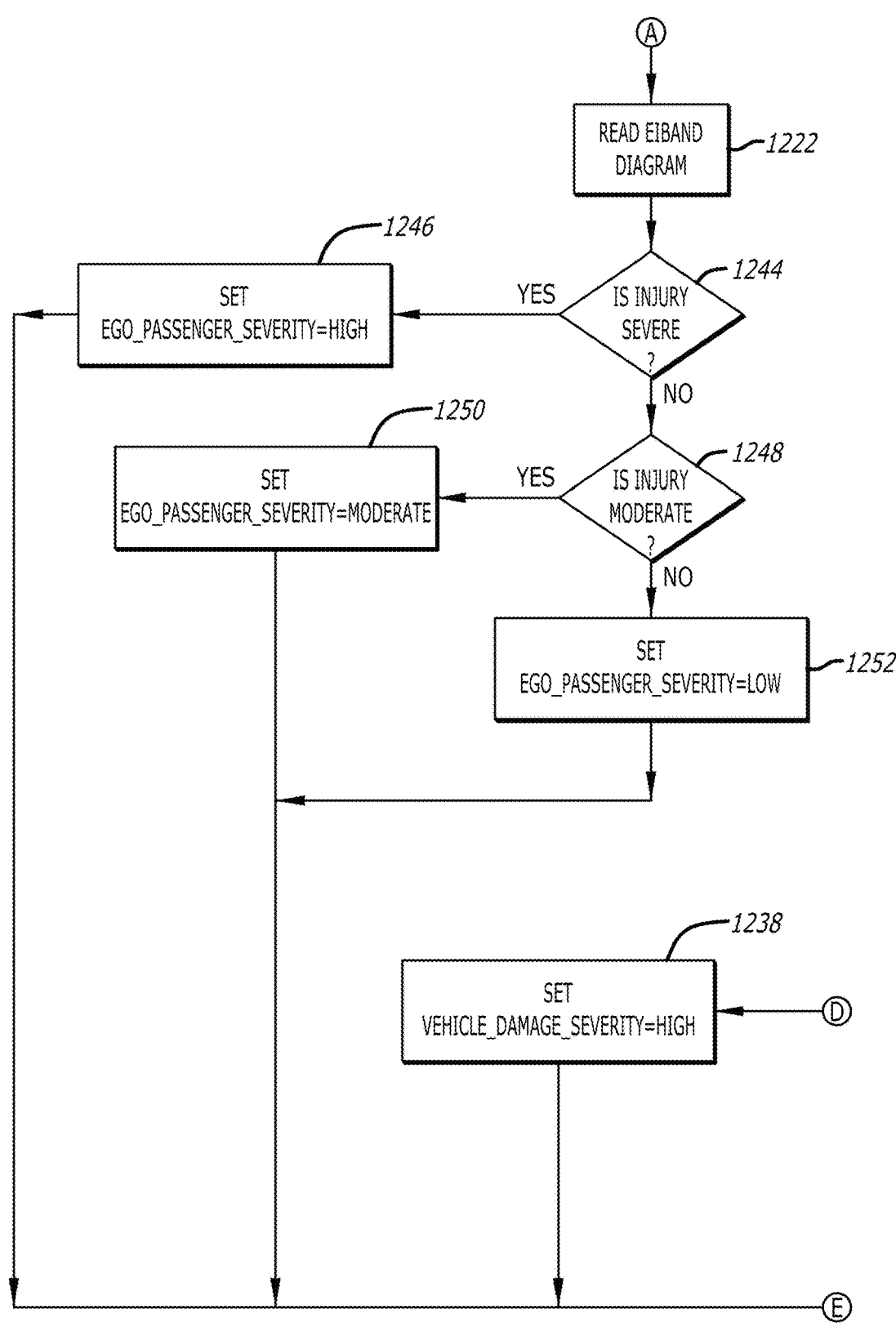
Figure 12C:
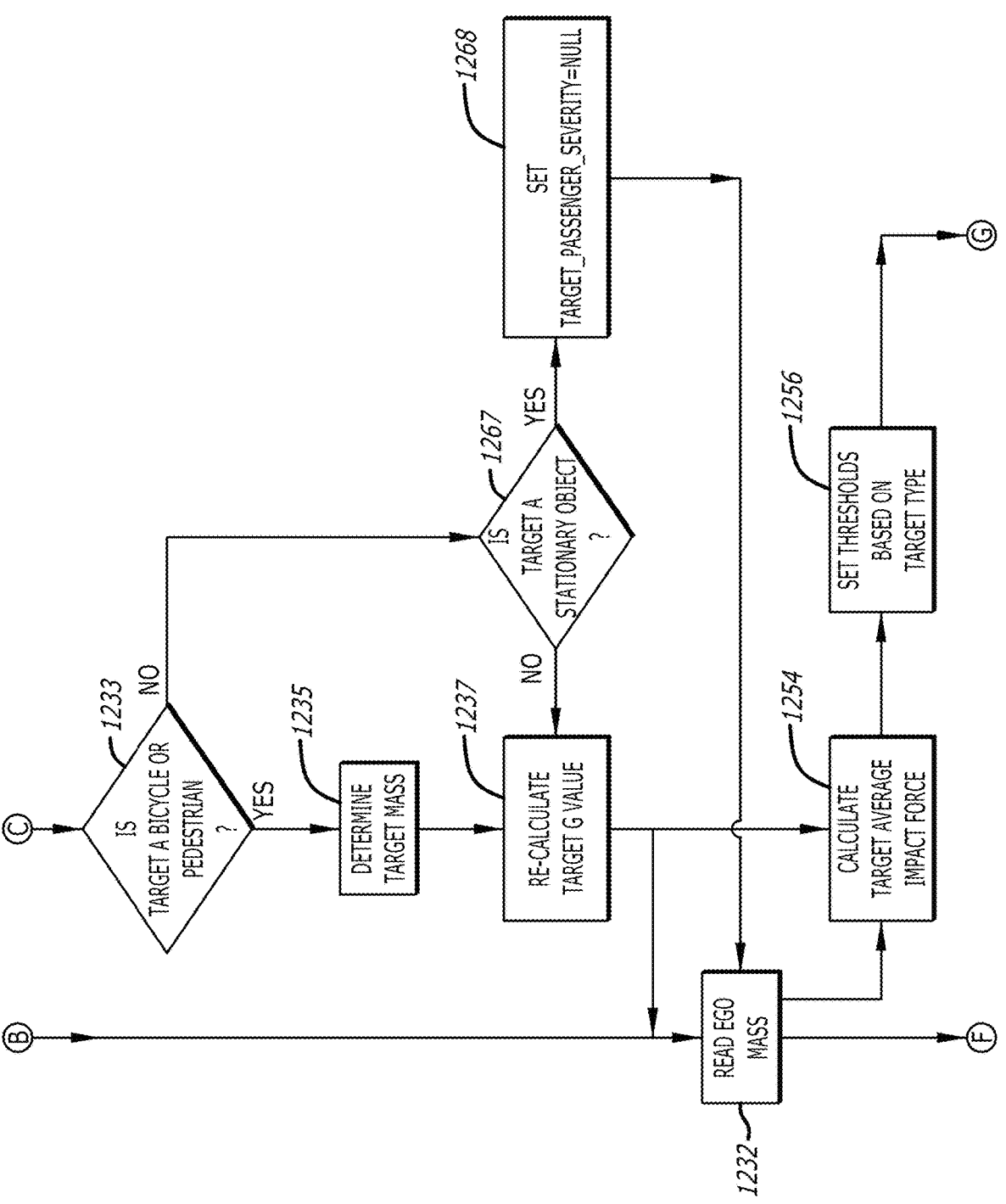
Figure 12D:
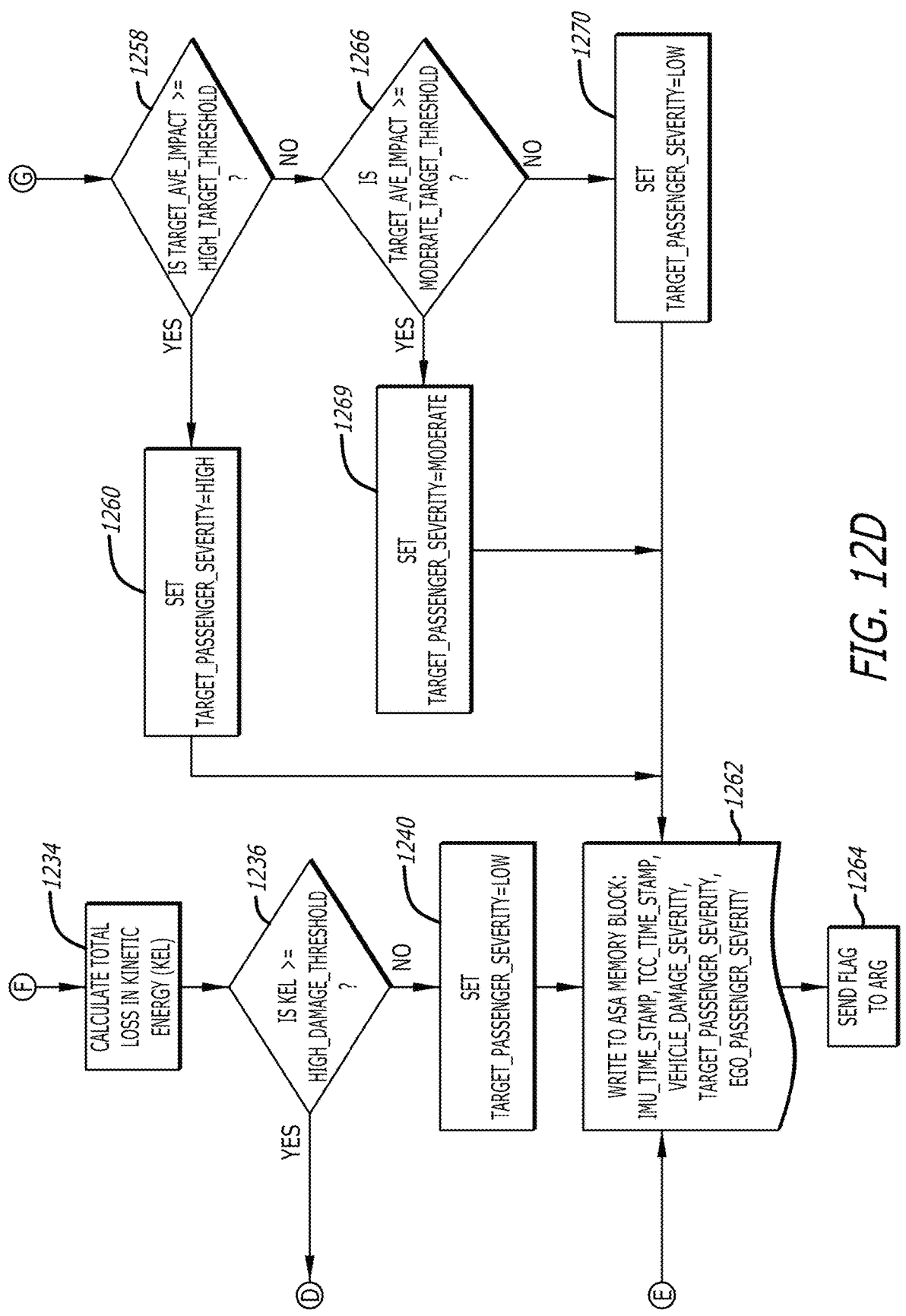

FIG. 9 is a flow diagram illustrating the operations of the Time to Collision Data Collector (TTCDC) 900. The TTCDC starts 902 by setting the global high frequency flag to the Off position and reads the global high frequency time from the threshold settings 904. With the global high frequency flag set to Off, the TTCDC then retrieves 906 the following items from the Time to Collision Sensor Processor (TTCSP):

Time to Collision (TTC) for each quadrant (front, rear, left, and right).

Distance to Collision (DTC) for each quadrant (front, rear, left, and right).

Ego vehicle speed.

Target vehicle speed for each quadrant (front, rear, left, and right).

Using the retrieved information, the TTCDC then sets the minimum TTC equal to the minimum TTC of all quadrants, and the minimum DTC equal to the minimum DTC of all quadrants 908. Next, the TTCDC checks if the minimum TTC is less than or equal to the preconfigured TTC threshold 910, which initiates a chain of conditional events described in further detail below. If the minimum TTC is less than or equal to the preconfigured TTC threshold 910, the TTCDC then checks if the minimum DTC is less than or equal to the preconfigured DTC threshold 912. If it is, the TTCDC turns On the TTC high frequency capture 914, sets the start time to the current time 916, and sets the global high frequency flag to the On position 918.

The TTCDC next checks if the global high frequency flag is On 924. If the global high frequency flag is On, the TTCDC subsequently checks if the global high frequency time interval plus the start time is greater than or equal to the current time stamp 920. If the global high frequency time interval plus the start time is greater than or equal to the current time stamp, the TTCDC turns Off the TTC high frequency capture 926, sets the global high frequency flag to the Off position 904, retrieves the next records from the TTCSP 906, and repeats the process from that point. If the global high frequency time interval plus the start time is not greater than or equal to the current time stamp 920, the TTCDC writes 922 the following information (hereinafter module data) to its memory block:

Current time.

TTC for each quadrant (front, rear, left, and right).

DTC for each quadrant (front, rear, left, and right).

Ego vehicle speed.

Target vehicle speed for each quadrant (front, rear, left, and right).

The TTCDC only writes information to memory when the ego vehicle is dangerously close to the target object based on the threshold condition checks 910/912.

The TTCDC then retrieves the next record from the TTCSP 906 and repeats the process.

If the minimum TTC is less than or equal to the preconfigured TTC threshold 910, but the minimum DTC is not less than or equal to the preconfigured DTC threshold 912, the TTCDC checks if the global high frequency flag is in the On position 924. If the global high frequency flag is in the On position, the TTCDC calculates if the global high frequency time interval plus the start time is greater than or equal to the current time stamp 920. If the global high frequency time interval plus the start time is greater than or equal to the current time stamp, the TTCDC turns Off the TTC high frequency capture 926, sets the global high frequency flag to the Off position 904, retrieves the next records from the TTCSP 906, and repeats the process.

If the global high frequency time interval plus the start time is not greater than or equal to the current time stamp 920, the TTCDC writes the module data to its memory block 922, retrieves the next records from the TTCSP 906, and repeats the process.

If the minimum TTC is not less than or equal to the preconfigured TTC threshold 910, the TTCDC checks if the global high frequency flag is in the On position 924. If the global high frequency flag is in the On position, the TTCDC calculates if the global high frequency time interval plus the start time is greater than or equal to the current time stamp 920. If the global high frequency time interval plus the start time is greater than or equal to the current time stamp, the TTCDC turns Off the TTC high frequency capture 926, sets the global high frequency flag to the Off position 904, retrieves the next records from the TTCSP 906, and repeats the process from that point. If the global high frequency time interval plus the start time is not greater than or equal to the current time stamp 920, the TTCDC writes the module data to its memory block 922, retrieves the next records from the TTCSP 906, and repeats the process.

Time To Collision Accident Detector (TTCAD)

FIG. 10 is a flow diagram illustrating the operations of the Time to Collision Accident Detector (TTCAD) 1000. The TTCAD starts 1002 by continuously analyzing the data collected from the TTC Data Collector (TTCDC) to determine whether there was an accident, and with what confidence.

As described previously, the TTCDC only writes data to its memory block when the DTC and TTC are below a preconfigured threshold. A set of data, as utilized below, is a sequence of data points where the time stamps are in consecutive intervals. The TTCAD reads the next set of DTC values from the TTCDC in the front, rear, left, and right quadrants 1004. It identifies the lowest DTC value in the set for the front, rear, left, and right quadrants 1006, 1008, 1010, 1012 and sets the accident confidence to "NONE" for the front, rear, left, and right quadrants 1014, 1016, 1018, 1020.

Front Quadrant

If the lowest DTC value in the front quadrant is below the preconfigured High confidence threshold (e.g., 1 cm) 1022, the front accident confidence is set to High 1024. The TTCAD then calculates the speed of the target object in the front quadrant immediately before the accident, the speed of the target object immediately after the accident, the speed of the ego vehicle immediately before the accident, and the speed of the ego vehicle immediately after the accident 1026. The TTCAD then writes to its memory block: the time stamp associated to the event in the front quadrant, the minimum DTC to the front target object, the TTC to the front target object, the ego vehicle's pre-collision speed, the ego vehicle's post-collision speed, the front target object's pre-collision speed, the front target object's post-collision speed, the accident confidence rating for a collision in the front quadrant, and the recorded impact duration for the front quadrant 1028.

If the front quadrant is not below the preconfigured High confidence threshold (e.g., 1 cm) 1022, it is next determined if the lowest DTC value in the front quadrant is below the preconfigured Moderate confidence threshold (e.g., 5 cm) 1030. If the lowest DTC value in the front quadrant is below the preconfigured Moderate confidence threshold, the front accident confidence is set to Moderate 1032. The TTCAD then calculates the speed of the target object in the front quadrant immediately before the accident, the speed of the target object immediately after the accident, the speed of the ego vehicle immediately before the accident, and the speed of the ego vehicle immediately after the accident 1026. The TTCAD then writes to its memory block: the time stamp associated with the event in the front quadrant, the minimum DTC to the front target object, the TTC to the front target object, the ego vehicle's pre-collision speed, the ego vehicle's post-collision speed, the front target object's pre-collision speed, the front target object's post-collision speed, the accident confidence rating for a collision in the front quadrant, and the recorded impact duration for the front quadrant 1028.

If a potential accident was recorded in the front quadrant, a flag is sent to the Accident Confidence Analyzer (ACA) 1034 to begin comparing the data to the input from the IMUAD and the TTCAD stores the next record counter 1036 which keeps track of the current record being processed, so the record number is used to retrieve the correct next record. The TTCAD then continues analyzing the next set of data from the TTCDC for potential collisions 1004.

If the lowest DTC is greater than the Moderate DTC front threshold 1030 then the IMUAD stores the next record counter 1036, The TTCAD then continues analyzing the next set of data from the TTCDC for potential collisions 1004.

Rear Quadrant

If the lowest DTC value in the rear quadrant is below the preconfigured High confidence threshold (e.g., 1 cm) 1038, the rear accident confidence is set to High 1040. The TTCAD then calculates the speed of the target object in the rear quadrant immediately before the accident, the speed of the target object immediately after the accident, the speed of the ego vehicle immediately before the accident, and the speed of the ego vehicle immediately after the accident 1042. The TTCAD then writes to its memory block: the time stamp associated to the event in the rear quadrant, the minimum DTC to the rear target object, the TTC to the rear target object, the ego vehicle's pre-collision speed, the ego vehicle's post-collision speed, the rear target object's pre-collision speed, the rear target object's post-collision speed, the accident confidence rating for a collision in the rear quadrant, and the recorded impact duration for the rear quadrant 1044.

If the rear quadrant is not below the preconfigured High confidence threshold (e.g., 1 cm) 1038, it is next determined if the lowest DTC value in the rear quadrant is below the preconfigured Moderate confidence threshold (e.g., 5 cm) 1046. If the lowest DTC value in the rear quadrant is below the preconfigured Moderate confidence threshold, the rear accident confidence is set to Moderate 1048. The TTCAD then calculates the speed of the target object in the rear quadrant immediately before the accident, the speed of the target object immediately after the accident, the speed of the ego vehicle immediately before the accident, and the speed of the ego vehicle immediately after the accident 1042. The TTCAD then writes to its memory block: the time stamp associated with the event in the rear quadrant, the minimum DTC to the rear target object, the TTC to the rear target object, the ego vehicle's pre-collision speed, the ego vehicle's post-collision speed, the rear target object's pre-collision speed, the rear target object's post-collision speed, the accident confidence rating for a collision in the rear quadrant, and the recorded impact duration for the rear quadrant 1044.

If a potential accident was recorded in the rear quadrant, a flag is sent to the Accident Confidence Analyzer (ACA) 1034 to begin comparing the data to the input from the IMUAD and the TTCAD stores the next record counter 1036. The TTCAD then continues analyzing the next set of data from the TTCDC for potential collisions 1004.

If the lowest DTC is greater than the Moderate DTC rear threshold 1046 then the IMUAD stores the next record counter 1036, The TTCAD then continues analyzing the next set of data from the TTCDC for potential collisions 1004.

Left Quadrant

If the lowest DTC value in the left quadrant is below the preconfigured High confidence threshold (e.g., 1 cm) 1050, the left accident confidence is set to High 1052. The TTCAD then calculates the speed of the target object in the left quadrant immediately before the accident, the speed of the target object immediately after the accident, the speed of the ego vehicle immediately before the accident, and the speed of the ego vehicle immediately after the accident 1054. The TTCAD then writes to its memory block: the time stamp associated with the event in the left quadrant, the minimum DTC to the left target object, the TTC to the left target object, the ego vehicle's pre-collision speed, the ego vehicle's post-collision speed, the left target object's pre-collision speed, the left target object's post-collision speed, the accident confidence rating for a collision in the left quadrant, and the recorded impact duration for the left quadrant 1056.

If the left quadrant is not below the preconfigured High confidence threshold (e.g., 1 cm) 1050, it is next determined if the lowest DTC value in the left quadrant is below the preconfigured Moderate confidence threshold (e.g., 5 cm) 1058. If the lowest DTC value in the left quadrant is below the preconfigured Moderate confidence threshold, the left accident confidence is set to Moderate 1060. The TTCAD then calculates the speed of the target object in the left quadrant immediately before the accident, the speed of the target object immediately after the accident, the speed of the ego vehicle immediately before the accident, and the speed of the ego vehicle immediately after the accident 1054. The TTCAD then writes to its memory block: the time stamp associated with the event in the left quadrant, the minimum DTC to the left target object, the TTC to the left target object, the ego vehicle's pre-collision speed, the ego vehicle's post-collision speed, the left target object's pre-collision speed, the left target object's post-collision speed, the accident confidence rating for a collision in the left quadrant, and the recorded impact duration for the left quadrant 1056.

If a potential accident was recorded in the left quadrant, a flag is sent to the Accident Confidence Analyzer (ACA) 1034 to begin comparing the data to the input from the IMUAD and the TTCAD stores the next record counter 1036. The TTCAD then continues analyzing the next set of data from the TTCDC for potential collisions 1004.

If the lowest DTC is greater than the Moderate DTC left threshold 1058 then the IMUAD stores the next record counter 1036. The TTCAD then continues analyzing the next set of data from the TTCDC for potential collisions 1004.

Right Quadrant

If the lowest DTC value in the right quadrant is below the preconfigured High confidence threshold (e.g., 1 cm) 1062, the right accident confidence is set to High 1064. The TTCAD then calculates the speed of the target object in the right quadrant immediately before the accident, the speed of the target object immediately after the accident, the speed of the ego vehicle immediately before the accident, and the speed of the ego vehicle immediately after the accident 1066. The TTCAD then writes to its memory block: the time stamp associated to the event in the right quadrant, the minimum DTC to the right target object, the TTC to the right target object, the ego vehicle's pre-collision speed, the ego vehicle's post-collision speed, the right target object's pre-collision speed, the right target object's post-collision speed, the accident confidence rating for a collision in the right quadrant, and the recorded impact duration for the right quadrant 1068.

If the right quadrant is not below the preconfigured High confidence threshold (e.g., 1 cm) 1062, it is next determined if the lowest DTC value in the right quadrant is below the preconfigured Moderate confidence threshold (e.g., 5 cm) 1070. If the lowest DTC value in the right quadrant is below the preconfigured Moderate confidence threshold, the right accident confidence is set to Moderate 1072. The TTCAD then calculates the speed of the target object in the right quadrant immediately before the accident, the speed of the target object immediately after the accident, the speed of the ego vehicle immediately before the accident, and the speed of the ego vehicle immediately after the accident 1066. The TTCAD then writes to its memory block: the time stamp associated with the event in the right quadrant, the minimum DTC to the right target object, the TTC to the right target object, the ego vehicle's pre-collision speed, the ego vehicle's post-collision speed, the right target object's pre-collision speed, the right target object's post-collision speed, the accident confidence rating for a collision in the right quadrant, and the recorded impact duration for the right quadrant 1068.

If a potential accident was recorded in the right quadrant, a flag is sent to the Accident Confidence Analyzer (ACA) 1034 to begin comparing the data to the input from the IMUAD and the TTCAD stores the next record counter 1036. The TTCAD then continues analyzing the next set of data from the TTCDC for potential collisions 1004.

If the lowest DTC is greater than the Moderate DTC right threshold 1070 then the IMUAD stores the next record counter 1036, The TTCAD then continues analyzing the next set of data from the TTCDC for potential collisions 1004.

Accident Confidence Analyzer (ACA)

FIGS. 11A-11E are a flow diagram illustrating the operations of the Accident Confidence Analyzer (ACA) 1100. The ACA incorporates the information from the IMU Accident Detector (IMUAD) and the TCC Accident Detector (TCCAD) to determine whether there was an accident, and with what confidence. If there is an accident, it sends a flag to the Accident Severity Analyzer (ASA) 1137 and restarts the ACA process 1102.

The ACA waits to receive a flag from the TTCAD 1104 or the IMUAD 1106/1110. If it receives a flag from both simultaneously, it begins the rest of its process immediately. If a flag is received from the TTCAD 1104, but not the IMUAD 1106, the ACA waits for a preconfigured time threshold (for example, 10 seconds) in case the other has a time delay in its records 1108. If a flag is not received from the TTCAD 1104, the ACA determines if a flag has been received from the IMUAD 1110. If a flag has been received from the IMUAD 1110, the ACA waits for a preconfigured time threshold (for example, 10 seconds) in case the other has a time delay in its records 1108.

After flags have been received from the TTCAD 1104 and/or the IMUAD 1106/1110, the ACA reads the next set of TTCAD records 1114 and the next set of IMUAD records 1116.

If a record is not received from the TTCAD 1104 and a record is not received from the IMUAD 1110, the ACA waits to receive a record from either 1112.

Front Quadrant

Next, for the front quadrant, the ACA determines whether the TTCAD and IMUAD have records within a preconfigured time threshold of each other (for example, one second) 1118. The ACA then assumes that the events correspond to the same accident.

If the IMUAD and TTCAD both have a record of an event occurring in the front quadrant, the ACA records a High confidence of an accident occurring and records the times at which the accident occurred according to both the IMUAD and the TTCAD 1120. The ACA needs to record both time stamps because they may differ by the preconfigured time threshold. The accident confidence and time stamps are recorded to the ACA memory 1122.

If the ACA determines that the TTCAD and IMUAD do not have records within a preconfigured time threshold of each other (for example, one second) 1118, a determination is made if there is a TTCAD record without an IMUAD record 1124. If the TTCAD has a High confidence that an accident occurred in the front quadrant 1126, but the IMUAD did not detect an accident in the front quadrant, the ACA sets a Moderate confidence of an accident occurring and saves the time at which the accident occurred according to the TTCAD 1128. The accident confidence and time stamps are recorded to the ACA memory 1122. If there is a TTCAD record without an IMUAD record in the front quadrant 1124 and the TTCAD does not have a High confidence that an accident occurred in the front quadrant 1126, then the ACA determines a collision has not occurred and does not record any information to memory and processes the next set of records 1114.

If the ACA determines that the TTCAD and IMUAD do not have records within a preconfigured time threshold of each other (for example, one second) 1118, a determination is made if there is a TTCAD record without an IMUAD record 1124. If there is not a TTCAD record without an IMUAD record 1124, this means that there is an IMUAD record without a TTCAD record and a determination is made as to whether the impact severity is High 1130. If the impact severity is High in the front quadrant, the ACA sets a Moderate confidence of an accident occurring, sets the time at which the accident occurred according to the IMUAD, and records the time at which the accident occurred according to the TTCAD as Null 1132. The accident confidence and time stamps are recorded to the ACA memory 1122.

If the IMUAD recorded a High impact event in the front quadrant with a Moderate or Low impact severity, but the TTCAD did not detect an accident in the front quadrant 1130, the ACA sets a Low confidence of an accident occurring, sets the time at which the accident occurred according to the IMUAD, and records the time at which the accident occurred according to the TTCAD as Null 1134. The accident confidence and time stamps are recorded to the ACA memory 1122.

If an accident was detected in the front quadrant by this process with High, Moderate, or Low confidence, the ACA writes the accident confidence and the relevant time stamp(s) under the front quadrant to its memory block and a flag is sent to the ASA 1137.

Rear Quadrant

This process may be run simultaneously for the rear quadrant as the ACA determines whether the TTCAD and IMUAD have records within a preconfigured time threshold of each other (for example, one second) 1136. The ACA then assumes that the events correspond to the same accident.

If the IMUAD and TTCAD both have a record of an event occurring in the rear quadrant, the ACA records a High confidence of an accident occurring and records the times at which the accident occurred according to both the IMUAD and the TTCAD 1138. The ACA needs to record both time stamps because they may differ by the preconfigured time threshold. The accident confidence and time stamps are recorded to the ACA memory 1142.

If the ACA determines that the TTCAD and IMUAD do not have records within a preconfigured time threshold of each other (for example, one second) 1136, a determination is made if there is a TTCAD record without an IMUAD record 1144. If there is a TTCAD record without an IMUAD record and if the TTCAD has a High confidence that an accident occurred in the rear quadrant 1146, the ACA sets a Moderate confidence of an accident occurring and saves the time at which the accident occurred according to the TTCAD 1148. The accident confidence and time stamps are recorded to the ACA memory 1142. If there is a TTCAD record without an IMUAD record in the rear quadrant 1144 and the TTCAD does not have a High confidence that an accident occurred in the rear quadrant 1146, then the ACA determines a collision has not occurred and does not record any information to memory and processes the next set of records 1114.

If the ACA determines that the TTCAD and IMUAD do not have records within a preconfigured time threshold of each other (for example, one second) 1136, a determination is made if there is a TTCAD record without an IMUAD record 1144. If there is not a TTCAD record without an IMUAD record 1144, this means that there is an IMUAD record without a TTCAD record and a determination is made as to whether the impact severity is High 1150. If the impact severity is High in the rear quadrant, the ACA sets a Moderate confidence of an accident occurring, sets the time at which the accident occurred according to the IMUAD, and records the time at which the accident occurred according to the TTCAD as Null 1152. The accident confidence and time stamps are recorded to the ACA memory 1142.

If the IMUAD recorded a High impact event in the rear quadrant with a Moderate or Low impact severity, but the TTCAD did not detect an accident in the rear quadrant 1150, the ACA records a Low confidence of an accident occurring, sets the time at which the accident occurred according to the IMUAD, and sets the time at which the accident occurred according to the TTCAD as Null 1154. The accident confidence and time stamps are recorded to the ACA memory 1142.

If an accident was detected in the rear quadrant by this process with a High, Moderate, or Low confidence, the ACA writes the accident confidence and the relevant time stamp(s) under the rear quadrant to its memory block and a flag is sent to the ASA 1137.

Left Quadrant

This process is run simultaneously for the left quadrant as the ACA determines whether the TTCAD and IMUAD have records within a preconfigured time threshold of each other (for example, one second) 1156. The ACA then assumes that the events correspond to the same accident.

If the IMUAD and TTCAD both have a record of an event occurring in the left quadrant, the ACA records a High confidence of an accident occurring and records the times at which the accident occurred according to both the IMUAD and the TTCAD 1158. The ACA needs to record both time stamps because they may differ by the preconfigured time threshold. The accident confidence and time stamps are recorded to the ACA memory 1162.

If the ACA determines that the TTCAD and IMUAD do not have records within a preconfigured time threshold of each other (for example, one second) 1156, a determination is made if there is a TTCAD record without an IMUAD record 1164. If there is a TTCAD record without an IMUAD record and if the TTCAD has a High confidence that an accident occurred in the left quadrant 1166, the ACA sets a Moderate confidence of an accident occurring and saves the time at which the accident occurred according to the TTCAD 1168. The accident confidence and time stamps are recorded to the ACA memory 1162. If there is a TTCAD record without an IMUAD record in the left quadrant 1164 and the TTCAD does not have a High confidence that an accident occurred in the left quadrant 1166, then the ACA determines a collision has not occurred and does not record any information to memory and processes the next set of records 1114.

If the ACA determines that the TTCAD and IMUAD do not have records within a preconfigured time threshold of each other (for example, one second) 1156, a determination is made if there is a TTCAD record without an IMUAD record 1164. If there is not a TTCAD record without an IMUAD record 1164, this means there is an IMUAD record without a TTCAD record, and a determination is made as to whether the impact severity is High 1170. If the impact severity is High in the left quadrant, the ACA sets a Moderate confidence of an accident occurring, sets the time at which the accident occurred according to the IMUAD 1172, and records the time at which the accident occurred according to the TTCAD as Null. The accident confidence and time stamps are recorded to the ACA memory 1162.

If the IMUAD recorded a High impact event in the left quadrant with a Moderate or Low impact severity, but the TTCAD did not detect an accident in the left quadrant 1170, the ACA records a Low confidence of an accident occurring, sets the time at which the accident occurred according to the IMUAD, and sets the time at which the accident occurred according to the TTCAD as Null 1174. The accident confidence and time stamps are recorded to the ACA memory 1162.

If an accident was detected in the left quadrant by this process with High, Moderate, or Low confidence, the ACA writes the accident confidence and the relevant time stamp(s) under the left quadrant to its memory block and a flag is sent to the ASA 1137.

Right Quadrant

This process may run simultaneously for the right quadrant as the ACA determines whether the TTCAD and IMUAD have records within a preconfigured time threshold of each other (for example, one second) 1176. The ACA then assumes that the events correspond to the same accident.

If the IMUAD and TTCAD both have a record of an event occurring in the right quadrant, the ACA records a High confidence of an accident occurring and records the times at which the accident occurred according to both the IMUAD and the TTCAD 1178. The ACA needs to record both time stamps because they may differ by the preconfigured time threshold. The accident confidence and time stamps are recorded to the ACA memory 1182.

If the ACA determines that the TTCAD and IMUAD do not have records within a preconfigured time threshold of each other (for example, one second) 1176, a determination is made if there is a TTCAD record without an IMUAD record 1184. If there is a TTCAD record without an IMUAD record and if the TTCAD has a High confidence that an accident occurred in the right quadrant 1186, the ACA sets a Moderate confidence of an accident occurring and saves the time at which the accident occurred according to the TTCAD 1188. The accident confidence and time stamps are recorded to the ACA memory 1182. If there is a TTCAD record without an IMUAD record in the right quadrant 1184 and the TTCAD does not have a High confidence that an accident occurred in the right quadrant 1186, then the ACA determines a collision has not occurred and does not record any information to memory and processes the next set of records.

If the ACA determines that the TTCAD and IMUAD do not have records within a preconfigured time threshold of each other (for example, one second) 1176, a determination is made if there is a TTCAD record without an IMUAD record 1184. If there is not a TTCAD record without an IMUAD record 1184, this means that there is an IMUAD record without a TTCAD record, and a determination is made as to whether the impact severity is High 1190. If the impact severity is High in the right quadrant, the ACA sets a Moderate confidence of an accident occurring, sets the time at which the accident occurred according to the IMUAD, and records the time at which the accident occurred according to the TTCAD as Null 1192. The accident confidence and time stamps are recorded to the ACA memory 1182.

If the IMUAD recorded a High impact event in the right quadrant with a Moderate or Low impact severity, but the TTCAD did not detect an accident in the right quadrant 1190, the ACA records a Low confidence of an accident occurring, sets the time at which the accident occurred according to the IMUAD, and sets the time at which the accident occurred according to the TTCAD as Null 1194. The accident confidence and time stamps are recorded to the ACA memory 1182.

If an accident was detected in the right quadrant by this process with High, Moderate, or Low confidence, the ACA writes the accident confidence and the relevant time stamp under the right quadrant to its memory block and a flag is sent to the ASA 1137.

Accident Severity Analyzer (ASA)

FIGS. 12A-12D are a flow diagram illustrating the operations of the Accident Severity Analyzer (ASA) 1200. The ASA uses the data collected from the other modules to determine how severe the accident was in terms of 3 measures: (1) the impact force on the passengers of the ego vehicle, (2) the impact force on the passengers of the target vehicle (when relevant), and (3) the damage inflicted on the ego vehicle and/or target object(s) involved. The process begins 1202 by determining if a flag has been received from the ACA 1204.

If a flag has not been received, the ASA waits until a flag is received from the ACA indicating an accident has been detected 1205.

When the ASA receives a flag, the TTC time stamp and IMU time stamp from the ACA memory block are read by the ASA 1206. Then, the ASA retrieves the data from the TTC Accident Detector (TTCAD) memory block with the corresponding TTC time stamp 1208. The data can include the distance to collision in each quadrant, time to collision in each quadrant, ego speed, impact duration in each quadrant, target object speed in each quadrant, as well as other data to perform the necessary computations.

The ASA also retrieves the data from the IMU Sensor Processor (IMUSP) memory block surrounding the corresponding time stamps 1210. The IMUSP data is retrieved based on the TTCAD and IMUAD time stamps. The data can include the 3-axis G value, the 3-axis speed, and the brake and acceleration pedal positions throughout the accident, as well as other data to perform the necessary computations.

The ASA then retrieves the data from the TTC Sensor Processor (TTCSP) memory block surrounding the corresponding TTC and IMU time stamps 1212, that is the ASA reads TTCSP data matching time stamps. The data includes the target vehicles' speeds in all four quadrants, the types of objects observed in each quadrant, whether all the passengers in the ego vehicle are wearing their seatbelts, as well as other data to perform the necessary computations.

The ASA then retrieves the data from the IMU Accident Detector (IMUAD) memory block with the corresponding IMU time stamp 1214, that is the ASA reads IMUAD data matching IMU time stamps. The data can include which quadrants experienced the impact, the G values from each quadrant, the pre-collision speed, the post-collision speed, and other data to perform the necessary computations.

Next, the ASA reads the TTCSP data to see if the passengers were wearing seatbelts 1216. If there is at least one passenger not wearing a seatbelt properly, the program adjusts the calculation of the impact force to the passengers in the ego vehicle 1218. This can mean adjusting the impact duration to be significantly shorter than the impact duration experienced by the vehicle, though other calculation adjustments may also apply. The ASA then calculates the impact force over the duration of the accident 1220. This requires, for example, using the G-force readings from the IMUSP as well as the change in speed over the duration of the accident.

If all the passengers are wearing seatbelts, the ASA proceeds to calculate the impact force over the duration of the accident 1220.

Next, the ASA reads an Eiband diagram and compares the impact force results to the Eiband diagram and uses the results to rank the severity of the accident for passengers in the ego vehicle 1222. If the injury to the passenger is severe on the Eiband diagram 1244, the passenger injury severity is set to High 1246. If injury to the passenger is not severe on the Eiband diagram 1244, a determination is made as to whether the passenger injury is Moderate on the Eiband diagram 1248. If the injury to the passenger is moderate 1248, the passenger injury severity is set to Moderate 1250. If injury to the passenger is not severe 1244 and not moderate 1248 on the Eiband diagram, the passenger injury severity is set to Low 1252. After setting the ego passenger severity to High 1246 or Moderate 1250 or Low 1252, the ASA writes to its memory block the relevant information, including the TCC time stamp, the IMU time stamp, the rating for the target passenger severity, the rating for the ego passenger severity, and the rating for the vehicle damage 1262. The ASA then sends a flag to the Accident Report Generator (ARG) 1264.

Simultaneous to determining the severity for the passengers in the ego vehicle, the ASA also determines what type of object the target object is (vehicle, pedestrian, bicycle, wall, tree, etc.) 1224.

If the target object is a vehicle 1228, the ASA approximates the mass by determining the vehicle's class and uses the typical mass for vehicles in that class 1230. Then the ASA approximates both the vehicle damage severity, and the severity for passengers in the target vehicle. First, to assess the damage to the vehicles, the ASA reads the ego vehicle's mass 1232.

Then, using the mass of both the ego vehicle and the target object, as well as their velocities both immediately before and after the accident, the ASA finds the loss in kinetic energy of the system 1234. The ASA also uses the braking information to calculate the kinetic energy lost due to braking of the ego vehicle. Due to the Law of Conservation of Energy, it can be assumed that the majority of the kinetic energy lost has been transformed into work performed to deform the vehicles, i.e., the amount of kinetic energy lost will correlate to the damage to the ego vehicle and to the target object. The ASA then determines whether the loss in kinetic energy is above a preconfigured threshold 1236. If the loss of kinetic energy is above the preconfigured threshold, the ASA sets the vehicle damage severity to High 1238. Otherwise, the ASA sets the vehicle damage severity to Low 1240, concluding the calculation of the vehicle damage severity.

To calculate the severity for the passengers in the target vehicle, the ASA uses the impact duration and change in speed of the target vehicle to calculate the average impact force 1254 over the accident on the passengers. If the target object is a vehicle, the ASA uses an Eiband diagram to determine the severity of the accident for the passengers in the target vehicle. Otherwise, it uses other preconfigured thresholds to determine the severity 1256.

If the injury to the passenger is severe 1258, the passenger injury severity is set to High 1260.

If injury to the passenger is not severe 1258, a determination is made as to whether the passenger injury is moderate 1266. If the injury to the passenger is moderate 1266, the passenger injury severity is set to Moderate 1269.

If injury to the passenger is not severe 1258 and not moderate 1266, the passenger injury severity is set to Low 1270.

If the target is a pedestrian or bicycle 1233, the ASA calculates the mass based on the typical mass of a human, or a human with a bicycle 1235. Then the ASA reforms how it calculates the impact force for the target object 1237. For example, it can adjust the impact duration due to the lack of protective structure around the persons in the target object. Next, the ASA calculates the average impact force 1254 and sets the thresholds based on the target type 1256.

A determination is then made as to whether the target impact is above a High target threshold 1258. If the target impact is above a High target threshold, the ASA sets the target passenger severity to High 1260 and then the ASA writes to its memory block the relevant information, including the TCC time stamp, the IMU time stamp, the rating for the target passenger severity, the rating for the ego passenger severity, and the rating for the vehicle damage 1262. The ASA then sends a flag to the Accident Report Generator (ARG) 1264.

If the target impact is not above a High target threshold, the ASA determines if the target impact is above a Moderate target threshold 1266. If the target impact is Moderate, the ASA sets the target passenger severity to Moderate 1269 and then the ASA writes to its memory block the relevant information, including the TCC time stamp, the IMU time stamp, the rating for the target passenger severity, the rating for the ego passenger severity, and the rating for the vehicle damage 1262. The ASA then sends a flag to the Accident Report Generator (ARG) 1264.

If the target impact is neither above a High target threshold nor a Moderate target threshold, the ASA sets the target passenger severity to Low 1270 and then the ASA writes to its memory block the relevant information, including the TCC time stamp, the IMU time stamp, the rating for the target passenger severity, the rating for the ego passenger severity, and the rating for the vehicle damage 1262. The ASA then sends a flag to the Accident Report Generator (ARG) 1264.

If the target object is not a bicycle or pedestrian 1233, the ASA determines if the target object is a stationary object, such as a wall or fire hydrant 1267. If the target object is a stationary object, the ASA sets the target passenger severity to Null 1268. The ASA then performs the calculation of ego vehicle damage described above. After setting the passenger severity to Null in 1268, the ASA reads the ego vehicle's mass 1232 and finds the loss in kinetic energy of the system 1234. The ASA also uses the braking information to calculate the kinetic energy lost due to braking of the ego vehicle. Due to the Law of Conservation of Energy, it can be assumed that the majority of the kinetic energy lost has been transformed into work performed to deform the vehicles, i.e., the amount of kinetic energy lost will correlate to the damage to the ego vehicle and to the target object. The ASA then determines whether the loss in kinetic energy is above a preconfigured threshold 1236. If the loss of kinetic energy is above the preconfigured threshold, the ASA sets the vehicle damage severity to High 1238. Otherwise, the ASA sets the vehicle damage severity to Low 1240, concluding the calculation of the vehicle damage severity. The ASA then writes to its memory block the relevant information, including the TCC time stamp, the IMU time stamp, the rating for the target passenger severity, the rating for the ego passenger severity, and the rating for the vehicle damage 1262. The ASA then sends a flag to the Accident Report Generator (ARG) 1264.

Accident Report Generator

Figure 13A:
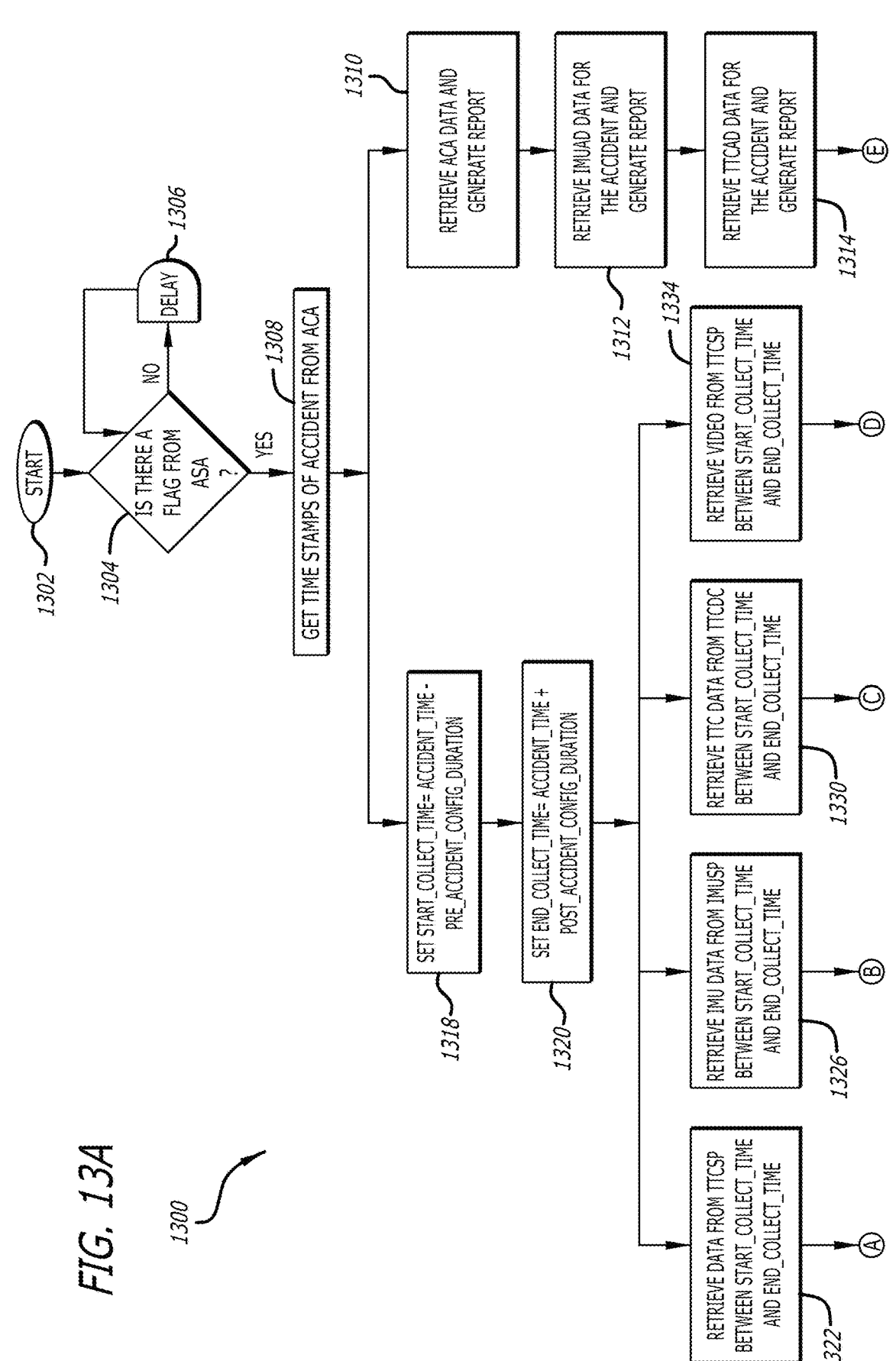
FIGS. 13A-13B are a flow diagram illustrating the operations of the Accident Report Generator (ARG).
Figure 13B:
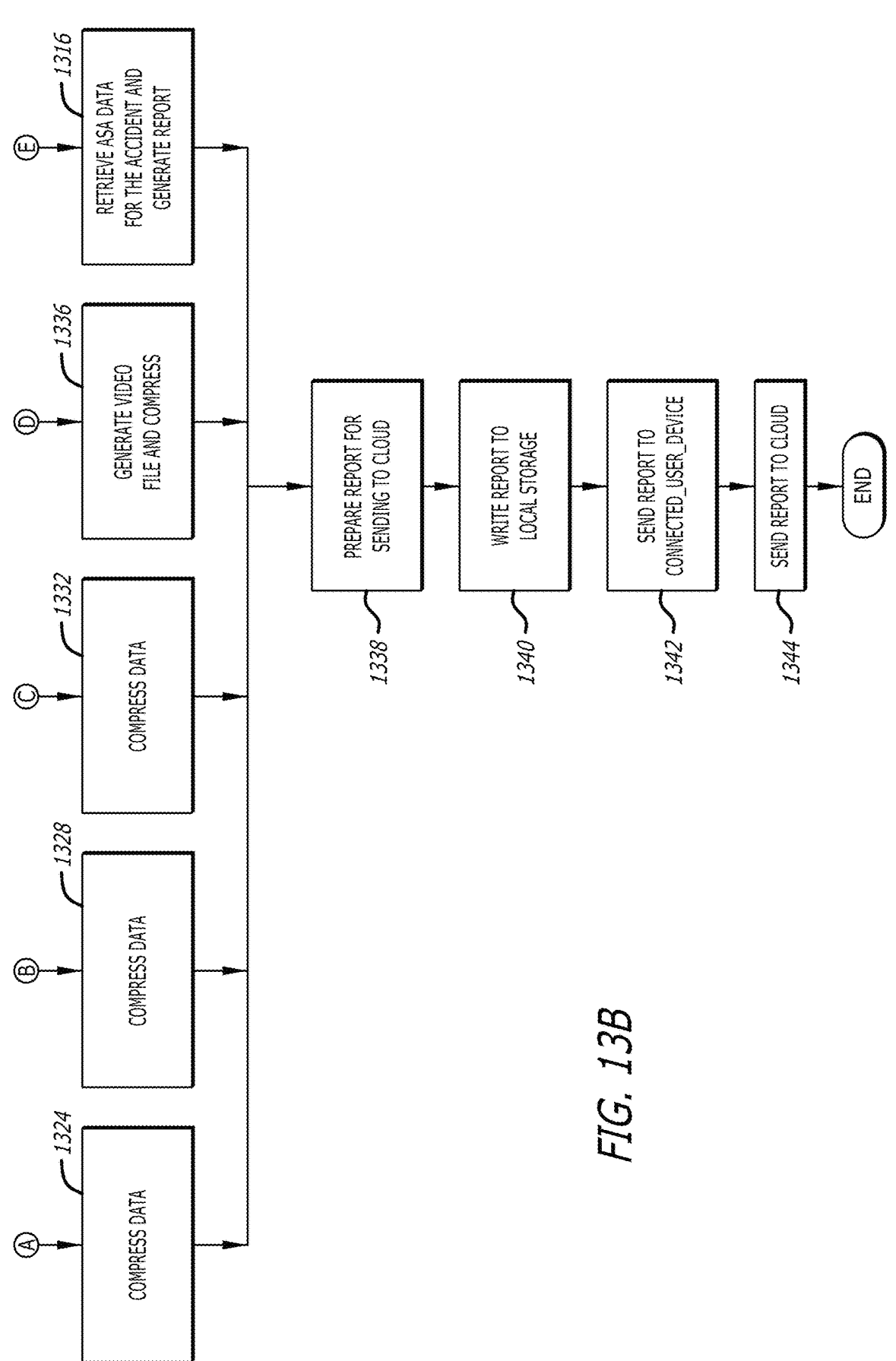

FIGS. 13A-13B are a flow diagram illustrating the operations of the Accident Report Generator (ARG) 1300. The process starts 1302 with the ARG determining if a flag from the Accident Severity Analyzer (ASA) has been received 1304. If a flag has not been received, the ARG waits until a flag is received from the ASA 1306. Once a flag is received, the ARG retrieves the TCC and IMU time stamps from the Accident Confidence Analyzer (ACA) 1308.

The ARG then retrieves the data from the ACA with the corresponding time stamp, and generates a report containing the accident confidence rating, and the quadrant(s) in which the accident occurred 1310. Next, the ARG retrieves the data from the IMUAD with the matching IMU time stamp and generates a report containing the impact for each relevant quadrant, the impact duration for each relevant quadrant, and the pre- and post-collision speeds of the targets in each relevant quadrant 1312.

Next, the ARG retrieves the data from the TTCAD with the matching TTC time stamp and generates a report containing the closest time to collision (TTC) and distance to collision (DTC), the TTC accident confidence in each relevant quadrant, the ego vehicle's speed at the time of the accident, and the impact duration for each relevant quadrant 1314. The ARG then retrieves the data from the ASA with the matching time stamps and generates a report containing the ego passenger severity, target passenger severity, and vehicle damage severity 1316.

The ARG also takes the time stamps from the ACA and calculates the start 1318 and end time 1320 of the accident using preconfigured intervals.

The ARG then retrieves the data from the TTC Sensor Processor (TTCSP) between the start and end times computed above 1322. The data it retrieves can include, but is not limited to, the target speeds in each relevant quadrant, the lane position of the ego vehicle, the ego vehicle passenger positions and seatbelt statuses, whether the driver of the ego vehicle was using a mobile device (e.g., cell phone), and whether the ego vehicle had recently run a red light or stop sign. The ARG then compresses the data from the TTCSP 1324.

The ARG also retrieves the data from the IMUSP between the start and end times computed above 1326. The data it retrieves can include the brake pedal duration percentage, the acceleration pedal duration percentage, the brake pedal position, the acceleration pedal position, the 3-axis G value, the 3-axis speed, and the GPS location. The ARG then compresses the data from the IMUSP 1328.

The ARG also retrieves the data from the Time to Collision Data Collector (TTCDC) between the start and end times computed above 1330. This data may include, but is not limited to, current time, TTC left, TTC right, TTC front, TTC rear, DTC left, DTC right, DTC front, DTC rear, ego speed, target speed left, target speed right, target speed front, target speed rear, etc. The ARG then compresses the data from the TTCDC 1332.

The ARG also retrieves the video (the 4 quadrants facing outward, and the cameras facing into the cabin) from the TTCSP between the start and end times computed above 1334. The ARG generates the video files and compresses them 1336.

The ARG then compiles a report 1338 using the compressed data and video 1324, 1328, 1332, 1336, along with the generated report that contains the ego passenger severity, target passenger severity, and vehicle damage severity 1316. The report may include, but is not limited to, the following information:

Time of the accident (TTC time stamp, IMU time stamp, start and end times).
  Which quadrants were involved in the accident.
  The IMU confidence rating for each relevant quadrant.
  The G force in each relevant quadrant.
  The impact duration for each relevant quadrant (from both TTCAD and IMUAD).
  The pre-collision speed of the target object in each relevant quadrant (from TTCSP).
  The post-collision speed of the target object in each relevant quadrant (from TTCSP).
  The TTC in each relevant quadrant.
  The DTC in each relevant quadrant.
  The TTC accident confidence rating in each relevant quadrant.
  The ego vehicle's pre-collision speed.
  The ego vehicle's post-collision speed.
  Brake and acceleration pedal percentage (%) durations.
  Brake and acceleration pedal positions.
  3-axis G values.
  3-axis speeds.
  GPS location of the accident.
  Lane position of the ego vehicle.
  Ego passenger severity.
  Target passenger severity.
  Vehicle damage severity.
  Ego vehicle passenger count and positions.
  Ego vehicle passenger seatbelt statuses.
  Ego vehicle driver phone/device distraction status.
  Red light/traffic sign violation status.
  Videos (4-quadrant and cabin view) corresponding to the accident.

The report is then saved to local storage 1340 and sent to the connected user device (for example, a connected cell phone) 1342. The report is sent to the cloud via wireless connection, where it can be reviewed by insurance providers, investigators, etc. 1344. The report can also be used to contact local emergency services if certain passenger severity or vehicle damage thresholds are met.

First Notice of Loss Sequence

Figure 14:
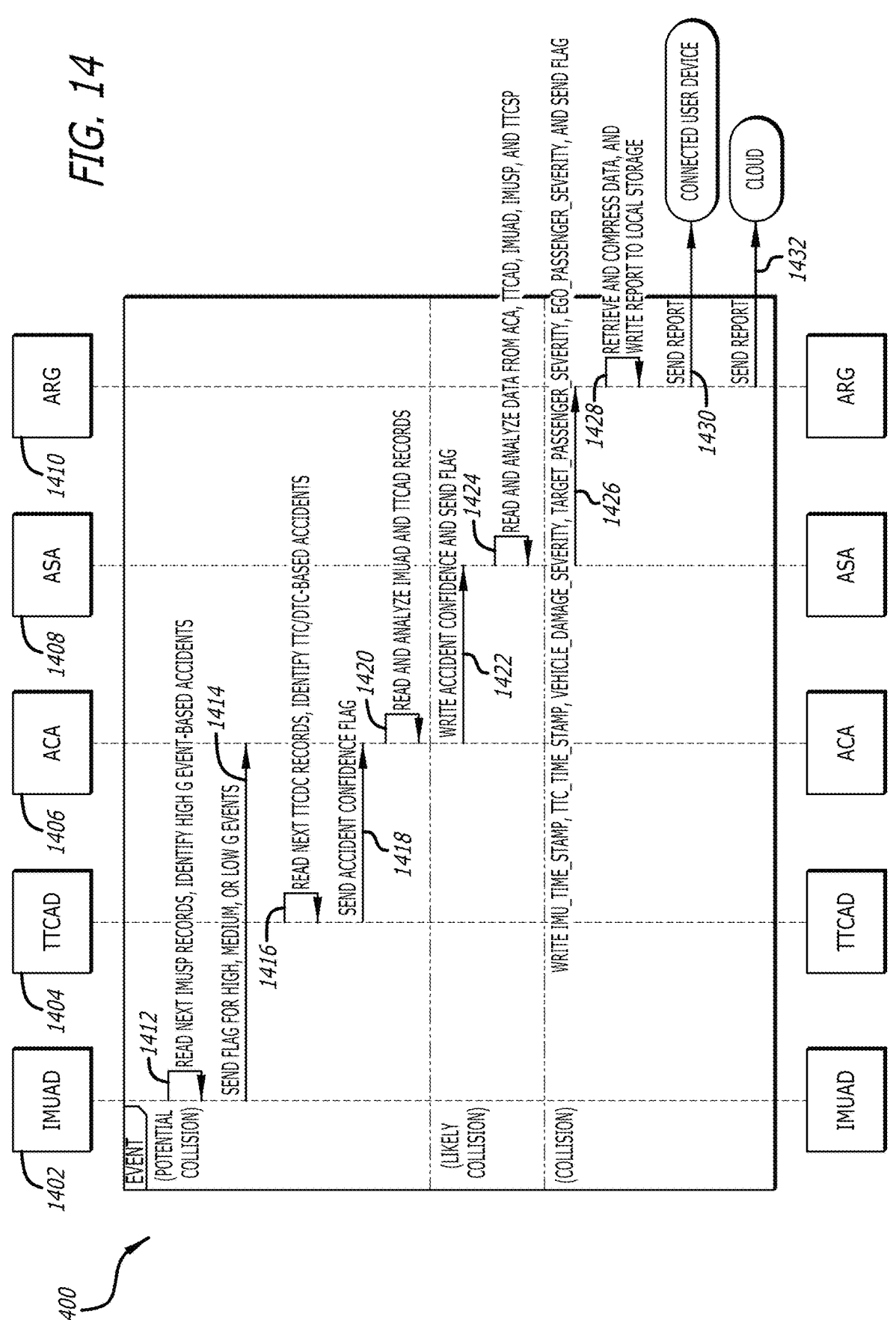
FIG. 14 is a flow diagram illustrating the sensor fusion-based First Notice of Loss (FNOL) sequence.

FIG. 14 is a flow diagram illustrating the sensor fusion-based First Notice of Loss (FNOL) sequence 1400. The sensor fusion-based FNOL sequence of communications between the IMU Accident Detector (IMUAD) 1402, TTC Accident Detector (TTCAD) 1404, Accident Confidence Analyzer (ACA) 1406, Accident Severity Analyzer (ASA) 1408, and Accident Report Generator (ARG) 1410.

The sensor fusion-based FNOL sequence illustrates the process of detecting high-G and close-proximity events, analyzing those events to determine the confidence level of a collision having occurred, and generating a report with details of the incident that is saved locally and sent to a connected user device and the cloud.

The Inertial Measurement Unit Sensor Processor (IMUSP) and Time to Collision Sensor Processor (TTCSP) are activated at the beginning of a trip and run continuously for the duration of the trip. The data collected from the IMUSP is read by the IMU Accident Detector (IMUAD) while the data collected from the TTCSP is read by the TTC Data Collector (TTCDC). The IMUAD checks for abnormal G events that exceed preconfigured thresholds for high, medium, and low-G events 1412. If one is detected, it sends a flag to the Accident Confidence Analyzer (ACA) for further analysis 1414. Similarly, the TTCAD is activated when the Time to Collision (TTC) or Distance to Collision (DTC) from the TTCDC is below a preconfigured threshold (that is, the TTCAD reads the next TTCDC records for identifying TTC/DTC-based accidents) 1416 and sends an accident confidence flag to the ACA 1418. The ACA then reads and analyzes IMUAD and TTCAD records 1420.

When the TTCDC is activated, it writes data to the TTC Accident Detector (TTCAD) for further analysis and an accident confidence flag is sent to the ACA. If either the TTCAD or the IMUAD sends a flag, there is a potential collision.

If the ACA receives flags from both the IMUAD and the TTCAD, a collision is likely. The ACA uses data from both the IMUAD and TTCAD to determine the confidence of a collision having occurred, which can be either High, Moderate, or Low. The ACA then sends the confidence flag to the Accident Severity Analyzer (ASA) 1422 for further processing.

The ASA uses data from the ACA, IMUAD, TTCAD, IMUSP, and TTCSP to determine the severity of damage to the vehicle, ego vehicle passengers, and target vehicle passengers 1424. The severity is classified as either Low or High for each category and a flag is sent to the Accident Report Generator (ARG) 1426.

Lastly, the ARG retrieves and compresses data from the ACA, TTCSP, IMUSP, TTCDC, TTCSP, IMUAD, and TTCAD 1428 to generate a collision report. It first writes the report to local storage, then sends the report to a connected user device 1430, before finally sending the report to the cloud 1432.

TTC Sensor Processor

The TTCSP incorporates multiple sensors, including but not limited to RADAR, LIDAR, computer vision, etc. The TTCSP records video to conduct road scene analysis, as well as monitoring the vehicle cabin, to produce outputs such as, but not limited to:

Speed and direction of the target objects relative to the ego vehicle in each quadrant (front, rear, left, right).
  An analysis of the type of object for each target object (vehicle and class, pedestrian, wall, etc.).
  Lane position of the ego vehicle.
  Ego vehicle passenger count and positions.
  Ego vehicle passenger seatbelt statuses.
  Distance of each target object to the ego vehicle (DTC) in each quadrant.
  Expected time until collision (TTC) in each quadrant.
  Whether the ego vehicle had recently run a red light or failed to stop at a stop sign.

Whether the driver of the ego vehicle was distracted by a mobile device (such as a cell phone, tablet, etc.).

Ego vehicle speed.

Figure 15:
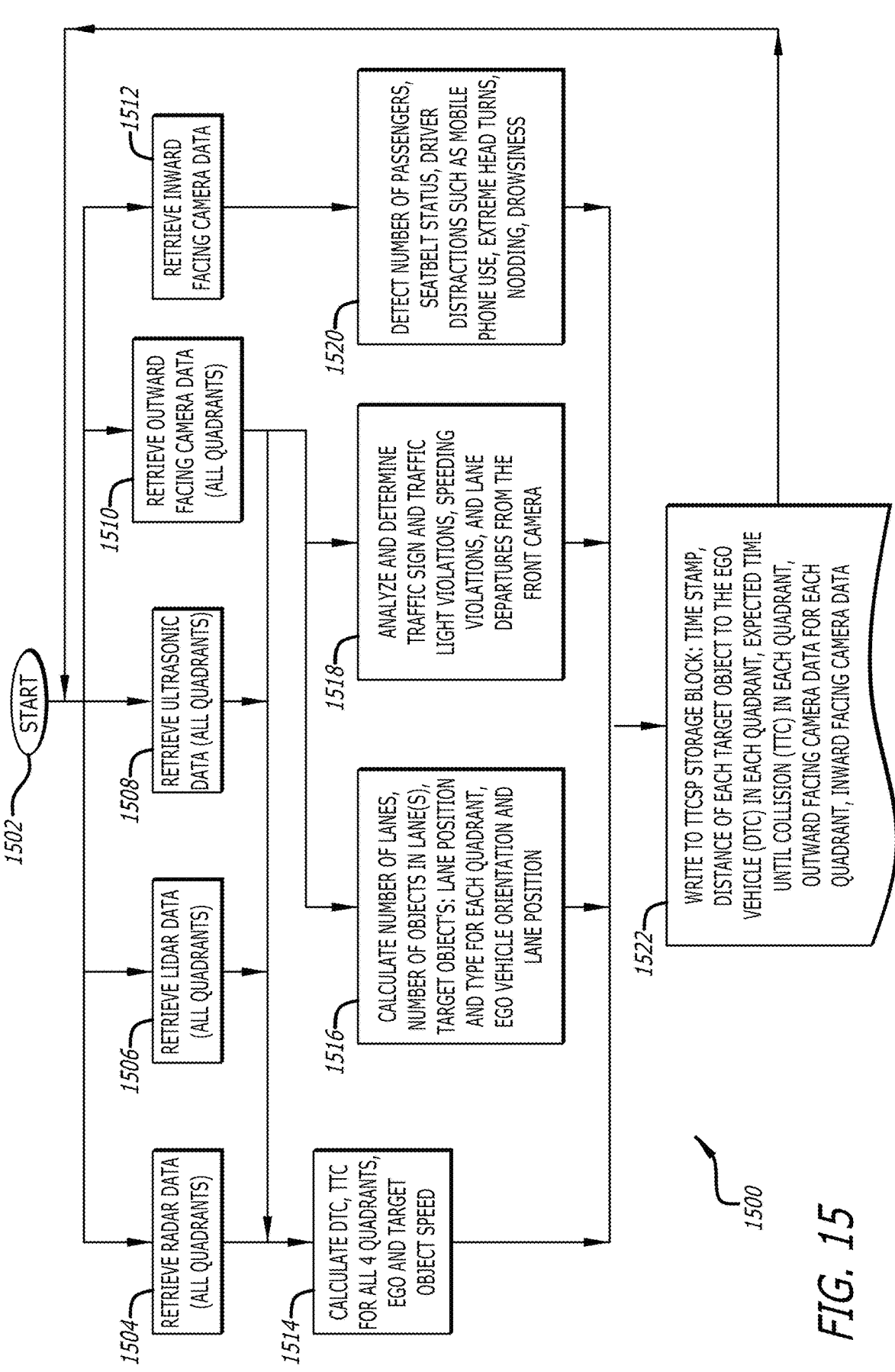
FIG. 15 is a flow diagram illustrating the operations of the TTC Sensor Processor (TTCSP).

FIG. 15 is a flow diagram illustrating the operations of the TTC Sensor Processor (TTCSP) 1500. The TTC Sensor Processor (TTCSP) runs continuously to collect and process data from various sensors. The sensors can include, but are not limited to, RADAR sensors, LIDAR sensors, ultrasonic sensors, outward facing cameras, and inward facing cameras. The sensors are used to detect both the situation surrounding the vehicle on the outside, and the status (including, but not limited to, position, orientation, and seatbelt status) of each of the passengers in the ego vehicle. The TTCSP calculations are already being implemented by OEM/aftermarket manufacturers. The present disclosure uses the outputs of the existing processes, so the TTCSP calculations themselves are outside of the present disclosure.

The process starts 1502 with the TTCSP continuously collecting data from the RADAR sensors (on the front, rear, left, and right quadrants) 1504, LIDAR sensors (on the front, rear, left, and right quadrants) 1506, ultrasonic sensors (on the front, rear, left, and right quadrants) 1508, outward facing cameras (on the front, rear, left, and right quadrants) 1510 and inward facing cameras 1512. The TTCSP uses the information from the sensors and outward facing cameras to calculate the distance to collision (DTC) and time to collision (TTC) in each quadrant 1514. The above sensors are also used to calculate the ego vehicle and target objects' speeds.

Using computer vision algorithms (not shown), the outward facing cameras can detect the number of lanes; the number of objects in each lane; the type of object surrounding the ego vehicle in the front, rear, left, and right quadrants; the lane position of the ego vehicle; and the orientation of the ego vehicle 1516.

The outward-facing cameras can also detect the traffic sign and traffic light violations, speeding violations, lane departures, visibility, weather conditions, etc. using computer vision algorithms (not shown) 1518.

Simultaneously, an inward facing camera is continuously recording data. Using computer vision algorithms, several items of data may be detected. These data can include, but are not limited to, the number of passengers, the seatbelt status of each passenger, and the driver's status (mobile phone use, extreme head turns, nodding, drowsiness, etc.) 1520.

The collected data is then written to the TTCSP memory block 1522. The TTCSP memory is stored temporarily and overwritten as sufficient new data is collected. The data can include, but is not limited to: time stamp; distance of each target object to the ego vehicle (DTC) in each quadrant; expected time to collision (TTC) in each quadrant; outward facing camera data for each quadrant; and inward facing camera data. The TTCSP then continuously repeats this entire process.

Figure 16:
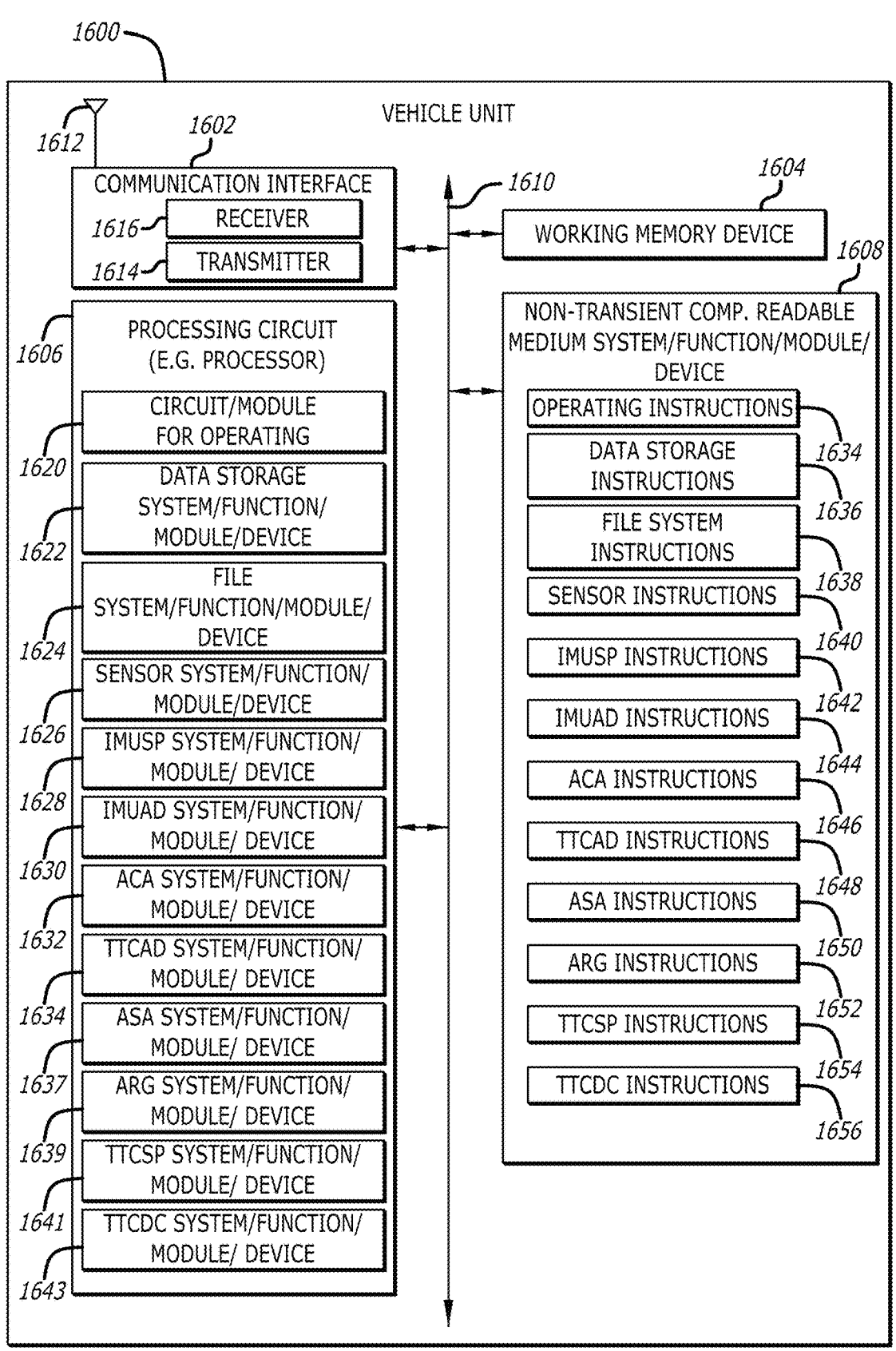
FIG. 16 illustrates a block diagram of an example hardware implementation of a vehicle unit configured to communicate according to one or more aspects of the disclosure.

FIG. 16 illustrates a block diagram of an example hardware implementation of a vehicle unit 1600 configured to communicate according to one or more aspects of the disclosure. The vehicle unit 1600 may include, for example, a communication interface 1602. The communication interface 1602 may enable data and control input and output. The communication interface 1602 may, for example, enable communication over one or more communication networks. The communication interface 1602 may be communicatively coupled, directly or indirectly, to the communication network(s). The vehicle unit 1600 may include a local working memory device 1604, and a processor system/ function/module/device (hereinafter the processor 1606). The processor 1606 may use the working memory device 1604 to store data that is about to be operated on, being operated on, or was recently operated on. The processor 1606 may store instructions on the working memory device 1604 and/or on one or more other memory structures or devices, such as, for example, non-transitory computer readable medium system/function/module/device (hereinafter the non-transitory computer readable medium 1608). When executed by the processor 1606, the instructions may cause the processor 1606 to perform, for example, one or more aspects of the methods described herein.

The vehicle unit 1600 may be implemented with a bus architecture, represented generally by the bus 1610. The bus 1610 may include any number of interconnecting buses and bridges depending on the specific application of the vehicle unit 1600 and overall design constraints. The bus 1610 may communicatively couple various circuits including one or more processors (represented generally by the processor 1606), the working memory device 1604, the communication interface 1602, and the non-transitory computer readable medium 1608. The bus 1610 may also link various other circuits and devices, such as timing sources, peripherals, voltage regulators, and power management circuits and devices, which are well known in the art, and therefore, are not described any further.

The communication interface 1602 provides a means for communicating with other apparatuses over a transmission medium. In some implementations, the communication interface 1602 includes circuitry and/or programming adapted to facilitate the communication of information bi-directionally with respect to one or more communication devices in a network. In some implementations, the communication interface 1602 is adapted to facilitate wireless communication of the vehicle unit 1600. In these implementations, the communication interface 1602 may be coupled to one or more antennas 1612 as shown in FIG. 16 for wireless communication within a wireless communication system. In some implementations, the communication interface 1602 may be configured for wire-based communication. For example, the communication interface 1602 could be a bus interface, a send/receive interface, or some other type of signal interface including drivers, buffers, or other circuitry for outputting and/or obtaining signals (e.g., outputting signal from and/or receiving signals into an integrated circuit). The communication interface 1602 can be configured with one or more standalone receivers and/or transmitters, as well as one or more transceivers. In the illustrated example, the communication interface 1602 includes a transmitter 1614 and a receiver 1616. The communication interface 1602 serves as one example of a means for receiving and/or means transmitting.

The processor 1606 may be responsible for managing the bus 1610 and general processing, including the execution of software stored on the non-transitory computer readable medium 1608. The software, when executed by the processor 1606, may cause the processor 1606 to perform the various functions described below for any particular apparatus or module. The non-transitory computer readable medium 1608 and the working memory device 1604 may also be used for storing data that is manipulated by the processor 1606 when executing software.

One or more processors, such as processor 1606 in the telematics unit 1600 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer readable medium, such as non-transitory computer readable medium 1608. Non-transitory computer readable medium 1608 may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable non-transitory medium for storing software, date, and/or instructions that may be accessed and read by a computer or the processor 1606. Computer readable media may also include, by way of example, a carrier wave, a transmission line, and any other suitable medium for transmitting software and/or instructions that may be accessed and read by a computer or the processor 1606.

The processor 1606 is arranged to obtain, process and/or send data, control data access and storage, issue commands, and control other desired operations. The processor 1606 may include circuitry configured to implement desired programming provided by appropriate media in at least one example.

The non-transitory computer readable medium 1608 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 1606 may include circuitry configured for various functions. For example, the processor 1606 may include a circuit/module for operating 1620 and configured to manage operation of the sensors and display and to perform input/output operations associated with access to the Internet and perform, for example, methods described herein. For example, the processor 1606 may include a data storage 1622 system/function/module/device configured to store data including data including but not limited to images, sensory data, event data, threshold levels, video data, driver data, score data and previously collected data sets. For example, the processor 1606 may include a file system/function/module/device 1624 configured to control how data is stored and retrieved. For example, the processor 1606 may include an in-vehicle sensor system/function/module/device 1626 mounted in or on a vehicle configured to control sensor input and video input. For example, the processor 1606 may include an IMUSP system/function/module/device 1628 configured for retrieving, calculating, and writing data that is used by the IMU Accident Detector (IMUAD), Accident Report Generator (ARG), and Accident Severity Analyzer (ASA) when a high-G event is detected. For example, the processor 1606 may include an IMUAD system/function/module/device 1630 configured to continuously check the IMUSP's data for signs of an accident, such as an acceleration event too high to result from normal driving. For example, the processor 1606 may include an ACA system/function/module/device 1632 configured to incorporate the data from the IMUAD and TTCAD to determine whether a traffic accident occurred and stores the relevant data in the vehicle system memory and sends a message to an Accident Severity Analyzer (ASA). For example, the processor 1606 may include a TTCAD system/function/module/device 1634 configured to continuously analyze the data collected from the TTC Data Collector (TTCDC) to determine whether there was an accident, and with what confidence.

For example, the processor 1606 may include an ASA system/function/module/device 1637 configured to use the data collected from the other modules to determine how severe the accident was in terms of 3 measures: (1) the impact force on the passengers of the ego vehicle, (2) the impact force on the passengers of the target vehicle (when relevant), and (3) the damage inflicted on the ego vehicle and/or target object(s) involved. For example, the processor 1606 may include an ARG system/function/module/device 1639 configured to determine if a flag from the Accident Severity Analyzer (ASA) has been received If a flag has not been received, the ARG waits until a flag is received from the ASA and then retrieves the TCC and IMU time stamps from the ACA. For example, the processor 1606 may include TTCSP system/function/module/device 1641 configured to continuously collect and process data from various sensors in or on the vehicle. For example, the processor 1606 may include TTCDC system/function/module/device 1643 configured to continuously read the data from the TTCSP to determine when an accident is imminent.

In some aspects of the disclosure, the non-transitory computer readable medium 1608 of the vehicle unit 1600 may include instructions that may cause the various systems/functions/modules/devices of the processor 1606 to perform the methods described herein. For example, the non-transitory computer readable medium 1608 may include operating instructions or code 1634 to the circuit/module for operating 1620. For example, the non-transitory computer readable medium 1608 may include data storage instructions 1636 corresponding to the data storage system/function/module/device 1622. For example, the non-transitory computer readable medium 1608 may include file system instructions 1638 corresponding to the file system/function/module/device 1624. For example, the non-transitory computer readable medium 1608 may include sensor instructions 1640 corresponding to the in-vehicle sensor system/function/module/device 1626 mounted in or on a vehicle. For example, the non-transitory computer readable medium 1608 may include IMUSP instructions 1642 corresponding to the IMUSP system/function/module/device 1628. For example, the non-transitory computer readable medium 1608 may include IMUAD instructions 1644 corresponding to the IMUAD system/function/module/device 1630. For example, the non-transitory computer readable medium 1608 may include ACA instructions 1646 corresponding to the ACA system/function/module/device 1632. For example, the non-transitory computer readable medium 1608 may include TTCAD instructions 1648 corresponding to the TTCAD system/function/module/device 1634. For example, the non-transitory computer readable medium 1608 may include ASA instructions 1650 corresponding to the ASA system/function/module/device 1637. For example, the non-transitory computer readable medium 1608 may include ARG instructions 1652 corresponding to the ARG system/function/module/device 1639. For example, the non-transitory computer readable medium 1608 may include TTCSP instructions 1654 corresponding to the TTCSP system/function/module/device 1641. For example, the non-transitory computer readable medium 1608 may include TTCDC instructions 1656 corresponding to the TTCDC system/function/module/device 1643.

CONCLUSION

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. The terms "at least one" and "one or more" may be used interchangeably herein.

Within the present disclosure, the terms "memory", "computer readable medium" and "storage" may be used interchangeably.

Within the present disclosure, use of the construct "A and/or B" may mean "A or B or A and B" and may alternatively be expressed as "A, B, or a combination thereof" or "A, B, or both". Within the present disclosure, use of the construct "A, B, and/or C" may mean "A or B or C, or any combination thereof" and may alternatively be expressed as "A, B, C, or any combination thereof".

One or more of the components, steps, features and/or functions illustrated herein may be rearranged and/or combined into a single component, step, feature, or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of:" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. One or more non-transitory computer readable media storing computer-executable instructions that upon execution cause one or more processors on a vehicle to perform acts comprising:

activating an Inertial Measurement Unit Sensor Processor (IMUSP) at a beginning of a trip in the vehicle for collection of IMUSP data;

activating a Time to Collision Sensor Processor (TTCSP) at the beginning of the trip for collection of TTCSP data wherein the TTCSP data comprises distance measurements and velocity measurements from one or more external-facing sensors used to compute a Time to Collision (TTC) value or a Distance to Collision (DTC) value for one or more objects external to the vehicle;

analyzing, on an IMU Accident Detector (IMUAD), the collected IMUSP data for an abnormal event exceeding a first preconfigured threshold;

creating an IMUAD record using the analyzed IMUSP data;

transmitting, upon detection of the abnormal event, a first accident confidence flag to an Accident Confidence Analyzer (ACA) for further analysis;

analyzing, on a TTC Data Collector (TTCDC), the collected TTCSP data for the Time to Collision (TTC) value or the Distance to Collision (DTC) value below a second preconfigured threshold, wherein the TTC value or the DTC value indicates whether a collision with the one or more objects external to the vehicle is imminent before the collision occurs;

creating a TTCAD record using the analyzed TTCSP data;

analyzing, by the ACA, IMUAD and TTCAD records; and transmitting, upon detection of the TTC value or the DTC value below the second preconfigured threshold, a second accident confidence flag to an Accident Confidence Analyzer (ACA), wherein the first accident confidence flag is generated by the IMUAD based on the IMUSP data and the second accident confidence flag is generated based on the TTCSP data, such that the ACA receives independent confidence flags from both an IMU-based detection path and a TTC-based detection path.

2. The one or more non-transitory computer-readable media of claim 1, wherein the IMUSP and the TTCSP operate continuously during the trip.

3. The one or more non-transitory computer-readable media of claim 2, wherein the TTCDC captures the collected TTCSP data at a high frequency when the time to collision or distance to collision are below a preset threshold.

4. The one or more non-transitory computer-readable media of claim 1, wherein a confidence of an occurrence of an abnormal event is Moderate when an accident confidence from the TTCAD record is high and the first accident confidence flag from the IMUAD for a corresponding quadrant has not been detected.

5. The one or more non-transitory computer-readable media of claim 1, wherein a confidence of an occurrence of an abnormal event is Moderate when an accident confidence from the IMUAD is high and the first accident confidence flag from the TTCAD for a corresponding quadrant has not been detected.

6. The one or more non-transitory computer-readable media of claim 1, wherein a confidence of an occurrence of an abnormal event is Low when an accident confidence from the IMUAD is Moderate or Low and the first accident confidence flag from the TTCAD for a corresponding quadrant has not been detected.

7. The one or more non-transitory computer-readable media of claim 1, wherein there is no recorded occurrence of an abnormal event in the ACA when the accident confidence from the TTCAD is Moderate and there is no accident confidence flag from the IMUAD for the corresponding quadrant.

8. The one or more non-transitory computer-readable media of claim 1, wherein the IMUAD and the TTCAD operate continuously.

9. The one or more non-transitory computer-readable media of claim 1, wherein the TTCSP data and the IMUSP data are received from one or more internal sensors of the vehicle.

10. The one or more non-transitory computer-readable media of claim 9, wherein the one or more internal sensors includes data from at least one of before, during, and after the abnormal event.

11. The one or more non-transitory computer-readable media of claim 9, wherein the one or more internal sensors are located in a left quadrant, a right quadrant, a front quadrant, and a rear quadrant of the vehicle.

12. The one or more non-transitory computer-readable media of claim 11, wherein multiple collisions in different quadrants are detected simultaneously.

13. The one or more non-transitory computer-readable media of claim 1, wherein an occurrence of the abnormal event is high when the first accident confidence flag from the IMU-based detection path and the second accident confidence flag from the TTC-based detection path are both received by the ACA, thereby corroborating detection of the abnormal event through independent sensor modalities.

14. The one or more non-transitory computer-readable media of claim 13, wherein the ACA waits to receive records from both the TTCAD and IMUAD for a preset threshold before determining the confidence level of the abnormal event.

15. The one or more non-transitory computer-readable media of claim 13, wherein the ACA utilizes the IMUAD data and the TTCAD data to determine the confidence level of the abnormal event.

16. The one or more non-transitory computer-readable media of claim 15, further comprising:

determining, by the ASA, a severity of damage caused by the abnormal event, using data from the ACA, IMUAD, TTCAD, IMUSP, and TTCSP.

17. The one or more non-transitory computer-readable media of claim 16, wherein a severity of damage to an ego vehicle is classified as Low, Moderate, or High.

18. The one or more non-transitory computer-readable media of claim 17, wherein a severity of injury to passengers in an ego vehicle is classified as Low, Moderate, or High.

19. The one or more non-transitory computer-readable media of claim 18, wherein determining the severity of injury to the passengers in the ego vehicle includes use of seatbelts by the passengers in the ego vehicle.

20. The one or more non-transitory computer-readable media of claim 16, wherein the calculation of severity of injury to passengers in an ego vehicle is performed on a local device in or on the vehicle.

21. The one or more non-transitory computer-readable media of claim 17, wherein a target object type is used in determining a severity of damage.

22. The one or more non-transitory computer-readable media of claim 17, wherein a severity of injury to the target vehicle's passengers is classified as Null, Low, Moderate, or High.

23. The one or more non-transitory computer-readable media of claim 17, wherein the calculation of severity of injury to passengers in a target vehicle is performed on a local device in or on the vehicle.

24. The one or more non-transitory computer-readable media of claim 23, wherein the calculation of severity of injury to passengers in a target vehicle is performed on a local device in or on the vehicle.

25. The one or more non-transitory computer-readable media of claim 23, wherein the severity of damage is classified as Low, Moderate, or High.

26. The one or more non-transitory computer-readable media of claim 25, wherein the calculation of severity of damage is performed on a local device in or on the vehicle.

27. The one or more non-transitory computer-readable media of claim 25, wherein the calculation of severity of damage is performed in or on the vehicle.

28. The one or more non-transitory computer-readable media of claim 25, further comprising generating a collision report using data from the ACA, TTCSP, IMUSP, TTCDC, TTCSP, IMUAD, and TTCAD.

29. The one or more non-transitory computer-readable media of claim 28, wherein the collision report is generated by a local device in or on the vehicle.

30. The one or more non-transitory computer-readable media of claim 28, further comprising storing the collision report to a local storage device in or on the vehicle.

31. The one or more non-transitory computer-readable media of claim 28, further comprising transmitting the collision report to a connected user device.

32. The one or more non-transitory computer-readable media of claim 28, further comprising transmitting the collision report to a cloud.

* * * * *